(12) United States Patent
Subramaniam et al.

(10) Patent No.: US 12,235,791 B2
(45) Date of Patent: Feb. 25, 2025

(54) LOOP DRIVEN REGION BASED FRONTEND TRANSLATION CONTROL FOR PERFORMANT AND SECURE DATA-SPACE GUIDED MICRO-SEQUENCING

(71) Applicant: Intel Corporation, Santa Clara, CA (US)

(72) Inventors: Kameswar Subramaniam, Austin, TX (US); Christopher Russell, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 625 days.

(21) Appl. No.: 17/409,090

(22) Filed: Aug. 23, 2021

(65) Prior Publication Data

US 2023/0056699 A1  Feb. 23, 2023

(51) Int. Cl.
*G06F 9/38* (2018.01)
*G06F 9/32* (2018.01)
*G06F 15/78* (2006.01)

(52) U.S. Cl.
CPC .............. *G06F 15/78* (2013.01); *G06F 9/325* (2013.01); *G06F 9/3818* (2013.01)

(58) Field of Classification Search
CPC ............................... G06F 9/3818; G06F 9/325
See application file for complete search history.

(56) References Cited

U.S. PATENT DOCUMENTS

| | | | |
|---|---|---|---|
| 4,352,869 A | 10/1982 | Mellors | |
| 4,412,281 A | 10/1983 | Works | |
| 4,415,969 A | 11/1983 | Bayliss et al. | |
| 5,506,073 A | 4/1996 | Angell et al. | |
| 5,714,279 A | 2/1998 | Zajac, Jr. et al. | |
| 6,009,488 A | 12/1999 | Kavipurapu | |

(Continued)

FOREIGN PATENT DOCUMENTS

| | | |
|---|---|---|
| CN | 108011883 A | 5/2018 |
| CN | 114942722 A | 8/2022 |

(Continued)

OTHER PUBLICATIONS

Chen et al, "Using Dataflow to Optimize Energy Efficiency of Deep Neural Network Accelerators," IEEE Micro, IEEE Computer Society, May/Jun. 2017, 10 pages.

(Continued)

*Primary Examiner* — Jacob Petranek
(74) *Attorney, Agent, or Firm* — Spectrum IP Law Group LLC

(57) ABSTRACT

Methods and apparatus relating to loop driven region based frontend translation control for performant and secure data-space guided micro-sequencing are described. In an embodiment, Data-space Translation Logic (DTL) circuitry receives a static input and a dynamic input and generates one or more outputs based at least in part on the static input and the dynamic input. A frontend counter generates a count value for the dynamic input based at least in part on an incremented/decremented counter value and a next counter value from the DTL circuitry. The DTL circuitry is capable to receive a new dynamic input prior to consumption of the one or more outputs. Other embodiments are also disclosed and claimed.

25 Claims, 12 Drawing Sheets

(56) References Cited

U.S. PATENT DOCUMENTS

| | | | |
|---|---|---|---|
| 6,427,202 B1* | 7/2002 | Richardson | G06F 9/30145 712/E9.035 |
| 6,560,693 B1 | 5/2003 | Puzak et al. | |
| 6,625,694 B2 | 9/2003 | Masri et al. | |
| 6,678,847 B1 | 1/2004 | Perry et al. | |
| 6,684,298 B1 | 1/2004 | Dwarkadas et al. | |
| 6,687,789 B1 | 2/2004 | Keller et al. | |
| 6,766,442 B1 | 7/2004 | Kahle et al. | |
| 6,779,036 B1 | 8/2004 | Deshpande | |
| 6,826,651 B2 | 11/2004 | Michael et al. | |
| 6,947,047 B1* | 9/2005 | Moy | G06F 9/3888 345/506 |
| 7,017,011 B2 | 3/2006 | Lesmanne et al. | |
| 7,096,323 B1 | 8/2006 | Conway et al. | |
| 7,178,013 B1* | 2/2007 | Batcher | G06F 9/381 712/228 |
| 7,844,053 B2 | 11/2010 | Crispin et al. | |
| 8,041,898 B2 | 10/2011 | Moga et al. | |
| 8,392,665 B2 | 3/2013 | Moga et al. | |
| 8,539,212 B1 | 9/2013 | Kang et al. | |
| 9,160,034 B2 | 10/2015 | Kato et al. | |
| 9,164,900 B1 | 10/2015 | Schuttenberg | |
| 9,172,701 B2 | 10/2015 | Burch et al. | |
| 9,519,773 B2 | 12/2016 | Patel et al. | |
| 9,940,138 B2 | 4/2018 | Lopez et al. | |
| 10,008,735 B2 | 6/2018 | Ohtomo et al. | |
| 11,085,964 B2 | 8/2021 | Kurts et al. | |
| 11,216,366 B2 | 1/2022 | Durham et al. | |
| 2002/0078331 A1 | 6/2002 | Ju et al. | |
| 2002/0103979 A1 | 8/2002 | Koga | |
| 2002/0116662 A1 | 8/2002 | Hofstee et al. | |
| 2003/0023836 A1 | 1/2003 | Catherwood et al. | |
| 2003/0041212 A1 | 2/2003 | Creta et al. | |
| 2003/0149865 A1 | 8/2003 | Kadambi | |
| 2003/0163649 A1 | 8/2003 | Kapur et al. | |
| 2003/0163679 A1* | 8/2003 | Ganapathy | G06F 9/381 712/E9.058 |
| 2004/0078558 A1 | 4/2004 | Sprangle | |
| 2004/0123043 A1 | 6/2004 | Rotithor et al. | |
| 2004/0151986 A1 | 8/2004 | Park et al. | |
| 2005/0125640 A1 | 6/2005 | Ford et al. | |
| 2005/0198187 A1 | 9/2005 | Tierney et al. | |
| 2005/0198479 A1 | 9/2005 | Bean et al. | |
| 2006/0101209 A1 | 5/2006 | Lais et al. | |
| 2006/0143408 A1 | 6/2006 | Sistla | |
| 2006/0179291 A1* | 8/2006 | Di Gregorio | G06F 9/3851 712/228 |
| 2006/0206686 A1 | 9/2006 | Banerjee et al. | |
| 2006/0294344 A1 | 12/2006 | Hsu et al. | |
| 2007/0055826 A1 | 3/2007 | Morton et al. | |
| 2007/0055958 A1 | 3/2007 | Birenheide et al. | |
| 2007/0113059 A1* | 5/2007 | Tran | G06F 9/381 712/E9.058 |
| 2007/0233932 A1 | 10/2007 | Collier et al. | |
| 2008/0059710 A1 | 3/2008 | Handgen et al. | |
| 2008/0162868 A1 | 7/2008 | Glew | |
| 2009/0015589 A1 | 1/2009 | Luick et al. | |
| 2009/0248989 A1 | 10/2009 | Chicheportiche et al. | |
| 2009/0276581 A1 | 11/2009 | Moga et al. | |
| 2010/0275049 A1 | 10/2010 | Balakrishnan et al. | |
| 2010/0332762 A1 | 12/2010 | Moga et al. | |
| 2011/0045355 A1 | 2/2011 | Ichikawa | |
| 2011/0055523 A1 | 3/2011 | Kaplan et al. | |
| 2011/0283124 A1 | 11/2011 | Branover et al. | |
| 2012/0079214 A1 | 3/2012 | Moga et al. | |
| 2012/0131555 A1 | 5/2012 | Hossain et al. | |
| 2012/0159073 A1 | 6/2012 | Jaleel et al. | |
| 2012/0159074 A1 | 6/2012 | Sodhi et al. | |
| 2012/0301796 A1 | 11/2012 | Ohtomo et al. | |
| 2012/0308900 A1 | 12/2012 | Ogasa | |
| 2013/0246709 A1 | 9/2013 | Segelken et al. | |
| 2013/0275724 A1 | 10/2013 | Bharadwaj | |
| 2013/0295464 A1 | 11/2013 | Yanagi et al. | |
| 2014/0195790 A1 | 7/2014 | Merten et al. | |
| 2014/0297919 A1 | 10/2014 | Nachimuthu et al. | |
| 2015/0127983 A1 | 5/2015 | Trobough et al. | |
| 2015/0147659 A1 | 5/2015 | Kato | |
| 2015/0254186 A1 | 9/2015 | Sugimoto et al. | |
| 2016/0011975 A1 | 1/2016 | Ananthakrishnan et al. | |
| 2016/0103232 A1 | 4/2016 | Ouspenski et al. | |
| 2016/0149259 A1 | 5/2016 | Osada et al. | |
| 2016/0156064 A1 | 6/2016 | Miyashita et al. | |
| 2016/0204467 A1 | 7/2016 | Nogami et al. | |
| 2016/0248119 A1 | 8/2016 | Kato | |
| 2016/0268630 A1 | 9/2016 | Tsukada et al. | |
| 2016/0308210 A1 | 10/2016 | Sakuda et al. | |
| 2016/0342390 A1 | 11/2016 | Giesselmann et al. | |
| 2016/0359193 A1 | 12/2016 | Yi et al. | |
| 2017/0024205 A1 | 1/2017 | Kountanis et al. | |
| 2017/0040637 A1 | 2/2017 | Ceder et al. | |
| 2017/0093567 A1 | 3/2017 | Gopal et al. | |
| 2017/0179481 A1 | 6/2017 | Yamada et al. | |
| 2017/0187066 A1 | 6/2017 | Tsujimura et al. | |
| 2017/0222257 A1 | 8/2017 | Miyashita et al. | |
| 2017/0229734 A1 | 8/2017 | Furukawa et al. | |
| 2017/0243203 A1 | 8/2017 | Bond et al. | |
| 2017/0286254 A1 | 10/2017 | Menon et al. | |
| 2017/0288281 A1 | 10/2017 | Chiang et al. | |
| 2017/0300418 A1 | 10/2017 | Reed et al. | |
| 2017/0344510 A1 | 11/2017 | Park et al. | |
| 2017/0353576 A1 | 12/2017 | Guim Bernat et al. | |
| 2018/0095752 A1 | 4/2018 | Kudaravalli et al. | |
| 2018/0183065 A1 | 6/2018 | Sasaki | |
| 2018/0269521 A1 | 9/2018 | Ohtomo et al. | |
| 2018/0300238 A1 | 10/2018 | Vembu et al. | |
| 2018/0307438 A1 | 10/2018 | Huang et al. | |
| 2019/0012267 A1 | 1/2019 | Scalabrino et al. | |
| 2019/0042799 A1 | 2/2019 | Durham et al. | |
| 2019/0067736 A1 | 2/2019 | Yoshioka et al. | |
| 2019/0088995 A1 | 3/2019 | Asano et al. | |
| 2019/0095345 A1 | 3/2019 | Zmudzinski et al. | |
| 2019/0095389 A1 | 3/2019 | Barnes et al. | |
| 2019/0097266 A1 | 3/2019 | Yamamoto et al. | |
| 2019/0097818 A1 | 3/2019 | Lu et al. | |
| 2019/0220284 A1 | 7/2019 | Gupta et al. | |
| 2019/0347213 A1 | 11/2019 | Lutz et al. | |
| 2020/0089504 A1 | 3/2020 | Sheikh et al. | |
| 2020/0125501 A1 | 4/2020 | Durham et al. | |
| 2020/0125770 A1 | 4/2020 | LeMay et al. | |
| 2020/0134417 A1 | 4/2020 | Mohapatra et al. | |
| 2020/0159676 A1 | 5/2020 | Durham et al. | |
| 2020/0169383 A1 | 5/2020 | Durham et al. | |
| 2020/0210183 A1 | 7/2020 | Burylov et al. | |
| 2020/0212481 A1 | 7/2020 | Nagamine et al. | |
| 2020/0228137 A1 | 7/2020 | Chinya et al. | |
| 2020/0328454 A1 | 10/2020 | Sakai et al. | |
| 2020/0328455 A1 | 10/2020 | Sakai et al. | |
| 2020/0328457 A1 | 10/2020 | Sakai et al. | |
| 2020/0328460 A1 | 10/2020 | Asano et al. | |
| 2020/0328461 A1 | 10/2020 | Asano et al. | |
| 2020/0328462 A1 | 10/2020 | Asano et al. | |
| 2020/0328464 A1 | 10/2020 | Asano et al. | |
| 2020/0328465 A1 | 10/2020 | Sakaida et al. | |
| 2020/0328468 A1 | 10/2020 | Sakaida et al. | |
| 2020/0328469 A1 | 10/2020 | Asano et al. | |
| 2020/0335817 A1 | 10/2020 | Asano et al. | |
| 2020/0348361 A1 | 11/2020 | Kurts et al. | |
| 2020/0350615 A1 | 11/2020 | Sakaida et al. | |
| 2020/0350622 A1 | 11/2020 | Sakaida et al. | |
| 2020/0371811 A1 | 11/2020 | Govindan et al. | |
| 2020/0379902 A1 | 12/2020 | Durham et al. | |
| 2020/0393557 A1 | 12/2020 | Manneschi | |
| 2020/0410327 A1 | 12/2020 | Chinya et al. | |
| 2021/0004233 A1 | 1/2021 | Kumar et al. | |
| 2021/0042617 A1 | 2/2021 | Chinya et al. | |
| 2021/0096861 A1 | 4/2021 | Wang et al. | |
| 2021/0117197 A1 | 4/2021 | Hsu et al. | |
| 2021/0200546 A1 | 7/2021 | LeMay et al. | |
| 2021/0326139 A1 | 10/2021 | Gupta et al. | |
| 2021/0357222 A1 | 11/2021 | Nair et al. | |
| 2021/0364571 A1 | 11/2021 | Kurts et al. | |
| 2021/0397454 A1 | 12/2021 | Plotnikov et al. | |
| 2022/0058023 A1 | 2/2022 | LeMay et al. | |

(56) References Cited

U.S. PATENT DOCUMENTS

| | | | |
|---|---|---|---|
| 2022/0091852 | A1 | 3/2022 | Gupta et al. |
| 2022/0100520 | A1 | 3/2022 | Pokam et al. |
| 2022/0206815 | A1* | 6/2022 | Wang .................... G06F 9/3004 |
| 2022/0261509 | A1 | 8/2022 | LeMay et al. |
| 2022/0343029 | A1 | 10/2022 | Sultana et al. |
| 2022/0413715 | A1 | 12/2022 | LeMay et al. |
| 2023/0056699 | A1 | 2/2023 | Subramaniam et al. |
| 2023/0091205 | A1 | 3/2023 | Moga et al. |
| 2023/0195388 | A1 | 6/2023 | Butera et al. |
| 2023/0214325 | A1 | 7/2023 | Shukla et al. |
| 2023/0315473 | A1 | 10/2023 | Azeem et al. |

FOREIGN PATENT DOCUMENTS

| | | | |
|---|---|---|---|
| CN | 115904504 | A | 4/2023 |
| CN | 116266122 | A | 6/2023 |
| CN | 116400960 | A | 7/2023 |
| EP | 0354774 | A2 | 2/1990 |
| EP | 0354774 | A3 | 8/1992 |
| EP | 2508985 | A1 | 10/2012 |
| EP | 4044027 | A2 | 8/2022 |
| EP | 4141654 | A1 | 3/2023 |
| EP | 4198717 | A1 | 6/2023 |
| EP | 4209915 | A1 | 7/2023 |
| EP | 4392868 | A1 | 7/2024 |
| GB | 2599006 | A | 3/2022 |
| TW | 202328926 | A | 7/2023 |
| WO | 2012040731 | A2 | 3/2012 |
| WO | 2012040731 | A3 | 6/2012 |
| WO | 2021162792 | A1 | 8/2021 |
| WO | 2022139850 | A1 | 6/2022 |

OTHER PUBLICATIONS

Chen et al. "Eyeriss: An Energy-Efficient Reconfigurable Accelerator for Deep Convolutional Neural Networks," in ISSCC 2016, IEEE International Solid-State Circuits Conference, Jan. 31-Feb. 4, 2016, 4 pages.
Intel Select Solutions for HPC & AI Converged Clusters [Magpie*], Solution Brief, Intel Select Solutions High Solutions High Performance Computing and AI, May 2019.
Jouppi et al. "In-Datacenter Performance Analysis of a Tensor Processing Unit," 2017 ACM/IEEE 44th Annual International Symposium on Computer Architecture (ISCA), Tornonto, ON, 2017, 12 pages.
LeMay, Michael "BackupRefPtr Spatial Safety Extension," 8 pages, Feb. 2021.
M. Al-Otoom, E. Forbes, and E. Rotenberg, "Exact: explicit dynamic branch prediction with active updates," in Proceedings of the 7th ACM international conference on Computing frontiers. ACM, 2010, pp. 165-176.
Sheikh, Rami, James Tuck, and Eric Rotenberg. "Control-flow decoupling." Proceedings of the 2012 45th Annual IEEE/ACM International Symposium on Microarchitecture. IEEE Computer Society, 2012.
Sheikh, Rami, James Tuck, and Eric Rotenberg. "Control-Flow Decoupling: An Approach for Timely, Non-speculative Branching," IEEE Transactions on Computers, Oct. 2014.
European Search Report for European Patent Application No. 22 183 309.8, issued Dec. 23, 2022, 11 pages.
SPEC CPU2006 Platform Settings for Lenovo Systems, downloaded from https://www.spec.org/cpu2006/flags/Lenovo-Platform-Flags-V1.2-SKL- . . . , on Sep. 7, 2021, 3 pages.
Ziad, Mohamed Tarek Ibn, "No-FAT: Architectural Support for Low Overhead Memory Safety Checks," Department of Computer Science, New York, NY, pp. 1-14.
Non-final Office Action for U.S. Appl. No. 17/357,963, mailed Apr. 9, 2024, 16 pages.
Notice of Allowance issued in U.S. Appl. No. 17/028,387, issued Mar. 27, 2024, 10 pages.
Resubmission: Spec CPU2006 Platform Settings for Lenovo Systems, downloaded from https://www.spec.org/cpu2006/flags/Lenovo-Platform-Flags-V1.2-SKL- . . . , on Sep. 7, 2021, 3 pages.
Rosenfeld et al., "Attacks and Defenses for JTAG," Politechnic Institute of New York University, Jan./Feb. 2010, 12 pages.
Valea Emanuele et al., "Encryption-Based Secure JTAG," 2019 IEEE 22nd International Symposium on Design and Diagnostics of Electronic Circuits and Systems (DDECS), IEEE, Apr. 24, 2019.
Extended European Search Report, issued by the European Patent Office on Oct. 19, 2022, 16 pages.
Extended European Search Report for application No. 22208089.7, issued Apr. 28, 2023, 7 pages.
Partial European Search Report, issued Jul. 12, 2022, for Application No. 22150649.6, 15 pages.
Sudhanshu Shukla et al., "Register File Prefetching," International Symposium on Computer Architecture (ISCA '22). ACM, NewYork, NY, USA, Jun. 18-22, 2022, published Jun. 11, 2022, 14 pages.
Amitabh Das et al., "Secure JTAG Implementation Using Schnorr Protocol," Journal of Electronic Testing, vol. 29, No. 2, pp. 193-209, 2013, 22 pages.
Cheuk Wong, "Analysis of DPA and DEMA Attacks," San Jose State University, Master's Projects, May 2012, 110 pages.
Office Action issued in U.S. Appl. No. 17/357,951, on Sep. 25, 2024, 11 pages.
Office Action issued in U.S. Appl. No. 17/479,582, mailed on Sep. 30, 2024, 11 pages.
Farooq, M. Umar, and Lizy K. John. "Store-load-branch (slb) predictor: A compiler assisted branch prediction for data dependent branches." High Performance Computer Architecture (HPCA2013), 2013 IEEE 19th International Symposium on. IEEE, 2013.
Gao, et al. "Address-branch correlation: A novel locality for long latency hard-to-predict branches," High Performance Computer Architecture, HPCA 2008, IEEE 14th International Symposium, Piscataway, New Jersey (Feb. 16, 2008).
GB Examination Report and Notification of Intention to Grant counterpart GB application GB21111963.1, Jun. 28, 2022, 2 pages.
Notice of Allowance from application No. 2028988 filed in NL, issued Jul. 29, 2022, 1 page (including Google machine translation). together with allowed claims in English, 3 pages.
Notice of Grant for counterpart GB application No. GB2599006, issued Sep. 13, 2022, 2 pages.
Notice of Grant from counterpart Dutch patent application under No. under No. 2028988, Jul. 27, 2022, 5 pages [with Google Translation].
Office Action issued on Apr. 4, 2022 for Dutch Patent Application No. 20228988.
B. Sinharoy et al. "IBM POWER8 processor core microarchitecture," IBM J. Res. & Dev. vol. 59 No. 1 Paper 2 Jan./Feb. 2015, 21 pages.
C.-L. K. Shum et al., "Design and microarchitecture of the IBM System z10 microprocessor," IBM J. Res. & Dev. vol. 53 No. 1 Paper 1 2009, 12 pages.
Das et al., "Secure JTAG Implementation Using Schnorr Protocol," Journal of Electronic Testing, vol. 29, No. 2, 2013, 22 pages.
Dixit et al., "silent data corruptions at scale," arXiv:2102.11245v1, Feb. 22, 2021, 8 pages.
European Examination Report for application No. 22208089.7, issued Jan. 18, 2024, 4 pages.
Final Office Action for U.S. Appl. No. 16/905,914, mailed Feb. 27, 2024, 16 pages.
Google translation of CN108011883A (May 8, 2018 Publication of CN108011883A, 8 pages) (Year: 2018).
Hochschild et al., "Cores that don't count," In Proceedings of the Workshop on Hot Topics in Operating Systems (pp. 9-16), 8 pages total, Jun. 2021.
Luiz Barroso et al., "Attack of the Killer Microseconds," downloaded on Sep. 21, 2022, from [https://cacm.acm. org/magazines/2017/4/215032-attack-of-the-killer-microseconds/fulltext], 8 pages.
International Search Report (PCT/US2022/037037), issued Oct. 27, 2022, 4 pages.
Shuwen Deng et al., "Leaky Frontends: Micro-Op Cache and Processor Frontend Vulnerabilities," arXiv:2105.12224v1. May 25, 2021, pp. 1-13.

(56) References Cited

OTHER PUBLICATIONS

Written Opinion of the International Searching Authority, issued Oct. 28, 2022, 7 pages.
Alves et al., "Early Address Prediction: Efficient Pipeline Prefetch and Reuse," ACM Transactions on Architecture and Code Optimization, vol. 18, No. 3, Jun. 8, 2021, 22 pages.
European Search Report for application No. EP 22206883, Jun. 12, 2023, 11 pages.
International Search Report for PCT/US2011/053317, published Mar. 29, 2012, 4 pages.
Chromium Blog: Efficient and Safe Allocations Everywhere!, downloaded from "https://blog.chromium.org/2021/04/efficient-and-safe-allocations-everyw," on Jun. 22, 2021, 6 pages.
IBM T. J. Watson Research Center, "IBM T. J. Watson Research Center," downloaded from https://ieeexplore.ieee.org/xpl/tocresult.jsp?isnumber=7175088 on Aug. 24, 2020, 6 pages.
Ioana Burcea et al., "Phantom—BTB: A Virtualized Branch Target Buffer Design," ASPLOS'09, Mar. 7-11, 2009, 11 pages.
James Bonanno et al., "Two Level Bulk Preload Branch Prediction," IEEE 978-1-4673-5587-2/13, 2013, 12 pages.
Narasimha Adiga et al, "The IBM z15 High Frequency Mainframe Branch Predictor," ACM/IEEE 47the International Symposium on Computer Architecture (ISCA), 2020, 13 pages.
Rakesh Kumar et al. "Blasting Through The Front-End Bottleneck With Shotgun," ASPLOS'18, Mar. 24-28, 2018, 13 pages.

\* cited by examiner

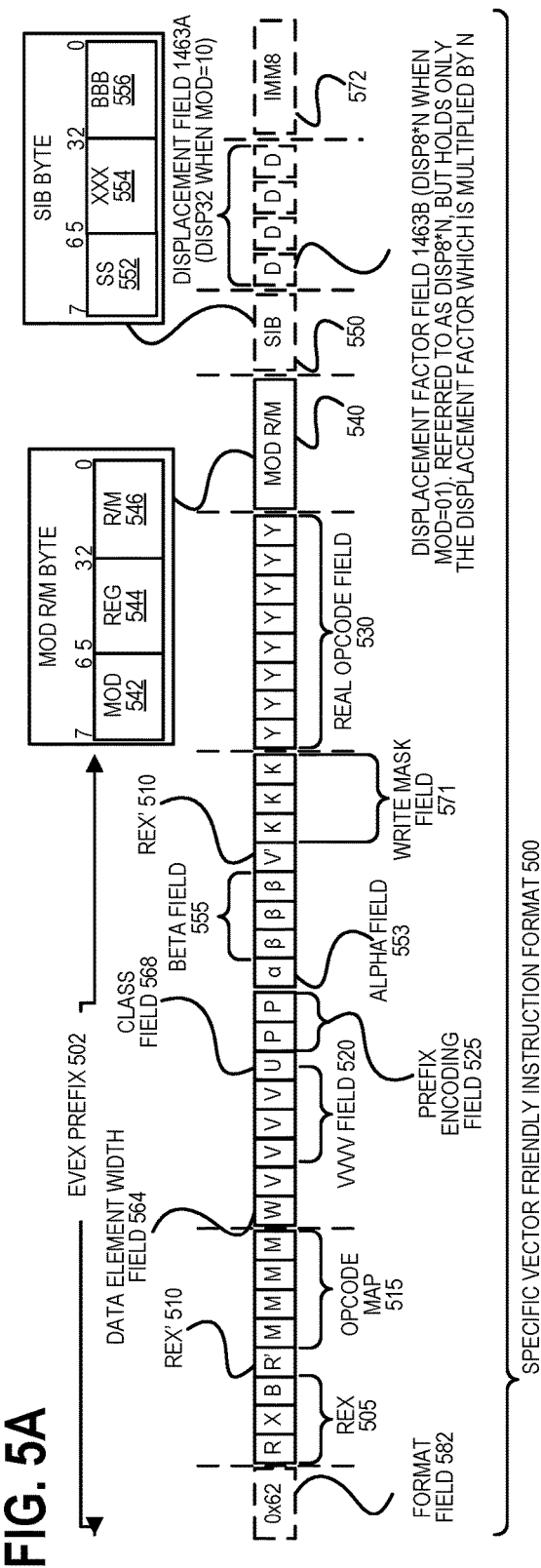
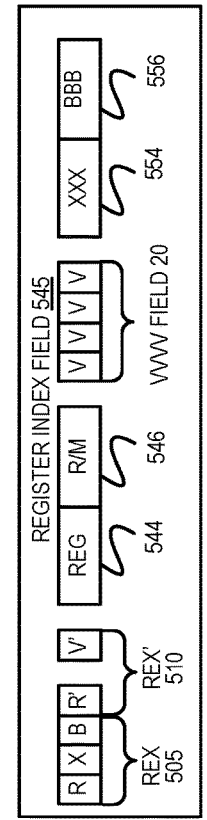
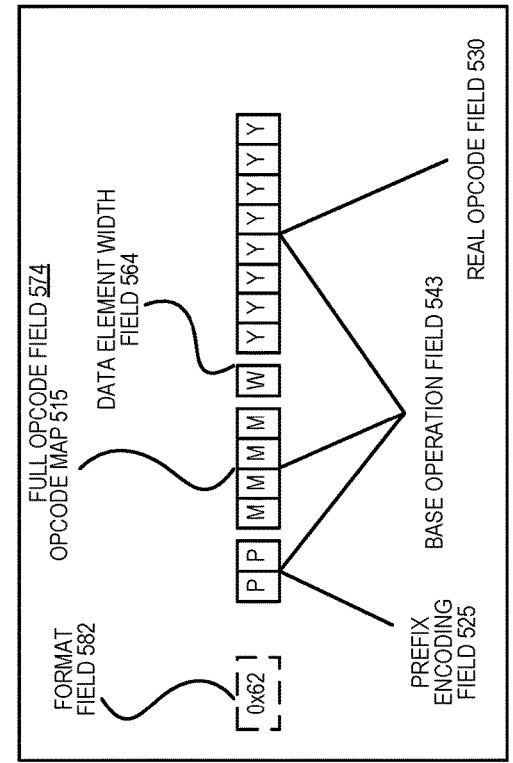
FIG. 5A
FIG. 5B
FIG. 5C

LOOP DRIVEN REGION BASED FRONTEND TRANSLATION CONTROL FOR PERFORMANT AND SECURE DATA-SPACE GUIDED MICRO-SEQUENCING

FIELD

The present disclosure generally relates to the field of electronics. More particularly, an embodiment relates to loop driven region based frontend translation control for performant and secure data-space guided micro-sequencing.

BACKGROUND

Many instructions with complex algorithms require multiple conditional decisions during execution that can slow down their execution, add functional complexity, and/or may cause security issues (including speculative side channels).

These include instructions that perform read/write operations, where the instruction operand data determines what operations need to be performed and in what sequence for that specific invocation of the instruction. Such instructions may also include save/store, context switch, state save-restore flows, and debug and tracing flows. These flows share a common characteristic that the flow inputs or instruction operand data determine which operations need to be performed and in what sequence for that specific invocation of that complex flow.

However, such approaches may pose performance, complexity, and/or security issues.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 5A is a block diagram illustrating an exemplary instruction format according to embodiments.

FIG. 5B is a block diagram illustrating the fields of the instruction format that make up the full opcode field according to one embodiment.

FIG. 5C is a block diagram illustrating the fields of the instruction format that make up the register index field according to one embodiment.

DETAILED DESCRIPTION

Figure 1:
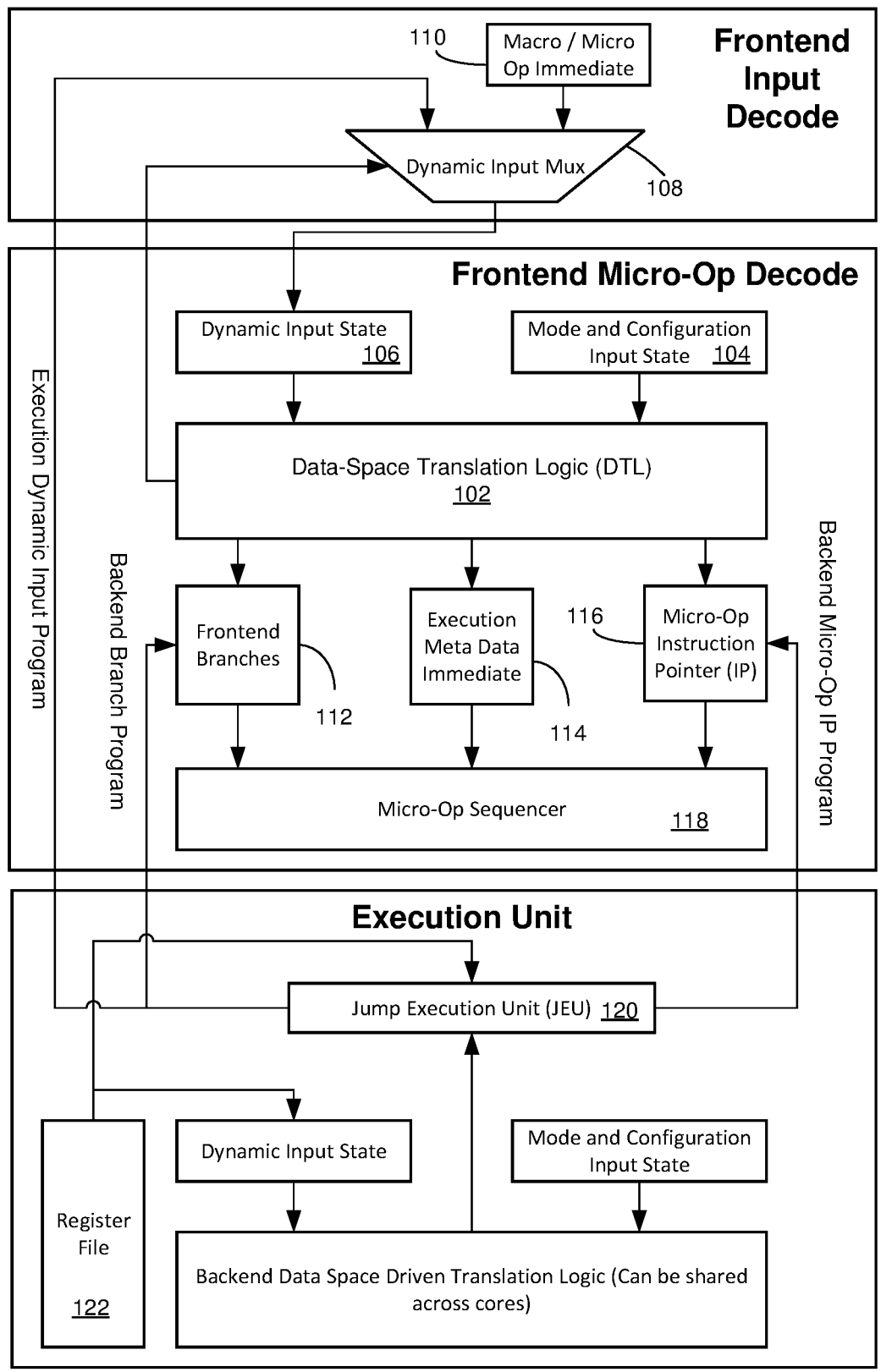
FIG. 1 illustrates a block diagram of components of a processor to provide issue, execution, and backend driven frontend translation control for performant and secure data-space guided micro-sequencing, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, many instructions with complex algorithms require multiple conditional decisions during execution that slow down their execution, add functional complexity, and/or may cause security issues (including speculative side channels). For example, complex behavioral sequences can be implemented as long software routines, e.g., encoded as micro-operations (e.g., into a Read Only Memory (ROM) or Programmable Logic Array (PLA) or similar structure) in the frontend of a processor. This can involve checking bits or fields of data operands, mapping each bit or field to a specific action, and branching over actions as needed using conditional branches and selects. There are also some implementations that may load control flow into frontend branches and micro-operation instruction pointers in the frontend of a processor.

However, the above-mentioned implementations may pose performance, complexity, and/or security issues. More particularly, performance is impacted by checking each bit or field of a data operand to determine the next step is an execution time decision point, i.e., a micro-operation branch that can mispredict and flush the pipeline. Also, micro-operation branch predictors are complex, not available for all flows and expensive, causing micro-operations to use static predictions. It is very common for all paths from these branches to be data dependent and equally likely. These predictions (static or dynamic) perform poorly for many data dependent algorithms, and do not eliminate the micro mispredict.

With respect to security issues, micro-operation branches introduce security complexity by allowing speculative execution to continue until the jump executes and the processor realizes those operations should not retire. Security validation is needed for these jumps, in particular side-channel analysis and preventing speculative execution of privileged state read or write blocks within a complex instruction. If the speculative micro-operations can be eliminated (e.g., through deciding the control flow in the frontend as in some embodiments), then security and performance improves, and security validation is reduced.

As for functional complexity, speculative writes to non-renamed state are one of the most common causes of complex flow bugs. The serialization needed to prevent these bugs can impact performance; often leading to aggressive optimizations like dependency chain tricks to improve performance, that further adds risk. Further, custom solutions created for specific flows like save and restore instruction sequences are hardware intensive, and do not scale for use across all the different flows.

Additionally, the traditional methods of implementing these data driven algorithms involve translating them to a flow-based algorithm with branches. This process is not straightforward to prove functional equivalence and introduces unnecessary complexity in both design and validation to ensure the formal data driven specification of the instruction exactly matches how the functional flow is implemented.

To address at least some of these issues, one or more embodiments make decisions in the frontend of a processor (i.e., prior to commencement of speculation operations and/or at issue), eliminating micro-operation branches, reducing complexity, and/or improving performance and speculation protection. Also, such techniques may be applied to complex flows like context switching, state save-restore flows, etc., such as System Management Interrupt (SMI), Resume from System Management mode (RSM), Precise Event-Based Sampling (PEBS), deeper C power states (like C6), Virtual Machine entry (VMentry), Virtual Machine exit (VMexit), and debug and tracing flows.

More particularly, some embodiments provide one or more techniques for issue, execution, and backend driven frontend translation control for performant and secure data-space guided micro-sequencing. In an embodiment, an optimized Data-space Translation Logic (DTL) is provided in the in the frontend of a Central Processing Unit (CPU) (also referred to herein interchangeably as a "processor"). The DTL may be implemented as a Programmable Logic Array (PLA). As discussed herein, a "Data-space Translation Logic" or "DTL" generally refers to logic that translates input data into output controls as well as payloads. The output from the DTL, in turn, is used to contour and/or direct/cause the behavior of the processor for the specific input data. Furthermore, as discussed herein, the "frontend" of a processor generally refers to components of a processor that perform operations to fetch and decode instructions/operations, and perform branch prediction, see, e.g., item 730 of FIG. 7B. In at least some embodiments, one or more of the instructions discussed herein may follow the EVEX format (such as discussed with reference to FIGS. 5A-5D).

Moreover, the input to the DTL can include relatively static components that change rarely or periodically (e.g., fuses or mode bits) and/or dynamic components that change for each lookup (e.g., instruction input). The dynamic DTL input may be programmed or provided at issue time from state already in the frontend, such as the immediate operand from an instruction or a micro-operation. An execution unit (e.g., Jump Execution Unit (JEU)) may be used to send data from a register file directly to the dynamic DTL input in the frontend. As discussed herein, a "Jump Execution Unit" or "JEU" generally refers to execution logic (e.g., provided in an execution unit/engine portion of a processor, such as the execution engine 750 of FIG. 7B) which can receive input data from a register file and/or a backend DTL and provides its output as dynamic input to the frontend DTL and/or to determine micro-operation instruction pointers (e.g., for micro-operation sequencing operations). In an embodiment, this execution unit does not send data already determined to be in the bogus (or mispredicted) path (which the JEU or execution unit already handles for branches). In an embodiment, a new mode is provided to atomically program multiple outputs (or frontend states) needed by a complex flow, such as frontend branch hints, immediate values, micro-operation instruction pointers, etc. As discussed herein, a "complex" flow generally refers to a flow with multiple decisions such as on whether to execute or skip over specific code blocks, depending on the input data/operand to the instruction.

As will be further discussed herein, a similar data-space translation logic in the backend of the processor may be provided in some embodiments. The backend DTL and the frontend DTL may be shared across multiple processor cores. At least one embodiment utilizes an indication from the frontend DTL to signal that the logic terms for the specific instruction input are transferred to the backend DTL.

The above-mentioned features work individually and in unison to reduce (or mostly eliminate) traditional serializing and mispredict prone micro-code algorithms for complex data driven instructions. For instance, one or more embodiments may enable one or more of the following: (1) immediate driven complex instructions with multiple data driven decision points requiring no frontend serialization or branch prediction; (2) fuse or mode-contoured constants that micro-operations can use directly as data or mask to avoid branches. This serves to both eliminate micro-operations and improve latency; (3) elimination of significant percentage of run time micro branches in complex instruction flows; (4) reduce speculation related functional and security issues, and performance improvement due to elimination of related serializations; (5) the shared backend DTL becomes a very effective way to offload and share the implementation of complex micro-operation based algorithms across cores with very minimal performance impact, while reducing the area of the critical frontend DTL.

Such embodiments provide technique to optimize and simplify complex Instruction Set Architecture (ISA)/instruction(s) and micro-operation flows in various processors (such as Atom® processors provided by Intel® Corporation). There is an overall reduction in the size and complexity of flows by restructuring them as a set of generic basic blocks controlled by data-space translation logic. In some embodiments, new versions of legacy register or memory operand only instructions may be created which support an immediate operand.

In one or more embodiments, techniques relating loop driven region based frontend translation control for performant and secure data-space guided micro-sequencing are provided. Such embodiments may provide one or more of: (1) the ability to program the dynamic DTL inputs separately from the programming of output (frontend states) (this pipelining support allows data to be sent to the DTL dynamic inputs before the DTL output data has been consumed, thus enabling multiple steps in a complex algorithm to execute in parallel without serialization); (2) the ability to connect a state machine (counter) to the DTL dynamic input (this allows multiple stages of output data starting from a single input, and once one step of the algorithm is done, the state machine increments the dynamic input without serialization or reprogramming, thus allowing the DTL output to control the next step of the algorithm); and/or (3) a mode where the DTL output for input "n" from the state machine also provides the value of the next state input, e.g., instead of always moving to "n+1", this provides a way to skip iterations or micro-operation code block regions of the algorithm based on the original input operand and mode.

Moreover, these embodiments work individually and in unison to enable one or more of the following: (1) elimination of significant percentage of run time micro branches in complex multi-stage instruction flows; (2) reduction of speculation related functional and security issues, and performance improvement due to elimination of related serializations; (3) pipelined chaining of a complex behavioral sequences of steps enabling a data dependent algorithm to be implemented in a performant manner, e.g., automated from a functional specification; and/or (4) allow complex algorithms to skip micro-operation code block regions based on operand data, particularly useful for state save/restore flows.

Moreover, some embodiments discussed herein provide techniques to optimize and simplify complex ISA/instruction and micro-operation flows in various processors (such as Atom® processors provided by Intel® Corporation). They can provide an overall reduction in the size and/or complexity of flows by restructuring them as a set of generic basic blocks controlled by data-space translation logic. Furthermore, new instructions may be created that directly leverage this hardware.

FIG. 1 illustrates a block diagram of components of a processor to provide issue, execution, and backend driven frontend translation control for performant and secure dataspace guided micro-sequencing, according to an embodiment.

Referring to FIG. 1, an optimized data-space translation logic (DTL) 102 is provided in the frontend of a CPU. The input to this logic has two components: a relatively static component (which may be programmed infrequently), such as on mode transitions 104 and a dynamic component (or dynamic input state 106) that is programmed on each lookup. In one embodiment, DTL 102 is implemented as a programmable logic array (PLA).

An instruction or event that transitions between one of the desired modes programs the static inputs with the information about the mode. This transition flow is typically longer latency, thus providing adequate pre and post serialization between instructions before and after the transition. The static input state can thus become stable well in advance of the instructions in the new mode or context, allowing more relaxed timing from those static input flops to the DTL outputs.

This separation of inputs allows fuse or mode-based decisions to be handled within the DTL. For example, it is very common to have different instruction behavior depending on the operating mode, privilege level, or context of the processor. When the instruction looks up the DTL with a dynamic input that indicates the specific instruction or reason the DTL is being invoked, the DTL can now produce slightly or completely different outputs depending on the static input mode.

As shown in FIG. 1, an embodiment provides the ability to program the dynamic DTL input (via multiplexer 108) at issue time from state already in the frontend, such as the immediate operand from an instruction or a micro-operation 110. This ability combined with the location of the DTL in the frontend of the processor naturally allows its output to be available very early in the pipeline on instruction issue (and, e.g., before commencement of speculation operations), based on instruction or micro-operation immediate data.

This approach yields at least the following benefits:

(a) The DTL can produce fuse or mode-contoured constants that micro-operations can use directly as data or mask to avoid branches. This output may represent a mask indicating what bits are reserved or available for modification by that instruction or micro-operation depending on the mode and immediate information. This serves to both eliminate micro-operations and improve latency.

(b) Enabling new immediate driven complex instructions with multiple data driven decision points requiring no frontend serialization or branch prediction. This may include new versions of legacy register or memory operand only instructions which support an immediate operand.

As shown in FIG. 1, DTL 102 may generate data for frontend branches 112, execution meta data 114, and a micro-operation Instruction Pointer (IP) 116, which are then provided to a micro-operation sequencer 118.

Furthermore, an execution unit (e.g., JEU 120) may be used to send data from a register file 122 directly to the dynamic DTL input flops (108) in the frontend. In at least one embodiment, the execution unit/JEU should not send data already determined to be in the bogus path (which the JEU already handles for jumps).

Many complex instructions in the x86 ISA have instruction operands where the data provided controls the algorithmic behavior of the instruction. This data value is only available after execution of operations in the backend of the processor, such as after reading the register file for the result of a previous operation. An embodiment leverages the datapath from the branch execution unit (JEU) to the frontend of the processor already used for branch target redirection to send the data value computed during instruction execution to the dynamic DTL inputs. This programming interface is naturally ordered by the existing JEU logic with respect to older mispredictable branches. This ordering ensures that data is not sent to the frontend on macro or micro-operations determined to be on the bogus path, i.e. in the shadow of a mispredicted branch.

Moreover, an embodiment provides a mode (via the DTL 102) to atomically program multiple outputs (frontend states) needed by a complex flow, such as frontend branch hints 112, immediate values 114, and micro-operation instruction pointers 116. In this mode the output of the DTL (obtained by looking it up with static and dynamic inputs) is used to program several special purpose states in the frontend of the processor.

For multiple micro-operation Instruction Pointer targets, once the DTL is invoked to program this state in the frontend, the instruction flow can use these as perfect indirect branch targets. The flow can jump to each of these in turn, with each target pointing to a different basic block. Since these targets have already been setup during the initial DTL lookup, all these basic blocks are chained with no execution penalty without the need for a branch predictor, or the possibility of speculatively issuing micro-operations from the wrong basic block.

For frontend branches, a complex algorithm for an instruction typically has multiple decision points, and for many of those the decision for whether the branch should follow the taken or not-taken path depends on the data operands for the instruction. Since these data operands are programmed into the DTL's dynamic inputs, some of the DTL outputs can be setup to simply represent the control for whether that specific branch condition is true or false. Since these controls are setup in the frontend atomically during the initial DTL lookup, the branch can resolve taken versus not-taken perfectly on issue of the micro-operation. Again, this eliminates mispredictions and speculative execution of code sequences not relevant to the input data space. For immediate values, the DTL may also produce multiple constant values specific to that instruction's dynamic input, which can be used as counts, shift amounts, masks, or simply data for results.

One of the past challenges with programming frontend state based on register file data was knowing when the programming has been completed in the frontend. In an embodiment, a solution is provided herein to solve this: (1) reserve one of the frontend branches as a "DTL looked up" indication when used in this context; (2) have the JEU path that looks up the DTL set this frontend branch when the programming of all frontend state has finished; (3) the flow can now simply keep testing this frontend branch until it transitions to indicate a successful program, and it will naturally not speculate until the programming is complete; and (4) when the branch is set, it implies all the frontend state (micro-operation IP targets, frontend branches, and immediate values) are successfully programmed and available for use on issue of the next micro-operation.

In some embodiments, new versions of legacy register or memory operand only instructions may be created which support an immediate operand. Such instructions can share the similar characteristic that the input data operand specifies the set of state that is read/written and special handling, as well as decisions, on what consistency checks are needed before accessing the state and other side effects.

An embodiment utilizes a similar data dependent logic (DTL) in the backend of the processor, potentially shared across multiple cores; and an indication from the frontend DTL that indicates that the logic terms for the specific instruction input are transferred to the backend DTL.

As more large complex flows become algorithmically controlled by the frontend DTL, some of these flows may not be as frequently invoked and can tolerate a longer latency between steps of their algorithms because of the latency of the individual steps themselves. Moving the logic gates specific to those flows from the frontend to a backend DTL and sharing that shared across cores allows some implementations to amortize the DTL logic area across the number of cores shared in a module. If more than one core in a module desires to the access the shared logic, it simply awaits its turn in a round robin or similar algorithm, leveraging the fact that the complex flow will functionally simply wait a little longer for its DTL output to be ready.

At run time, an embodiment has a way to know on a frontend DTL lookup that the logic gates corresponding to that instruction, input encoding, or mode do not exist in the frontend DTL. This can be done by reserving a frontend branch bit to indicate that this output is transferred to the backend DTL depending on the processor mode. The flow checks this bit when in the relevant mode and falls back to the alternative flow that looks up the shared DTL. The shared backend DTL output contain similar micro-operation IP pointers, frontend branch controls, and programs them using a direct path through the JEU to the frontend that bypasses the frontend DTL. The rest of the algorithm proceeds as usual.

Hence, the shared backend DTL becomes a very effective way to offload and share the implementation of complex algorithms across cores with very minimal performance impact while reducing the area of the critical frontend DTL.

Figure 2:
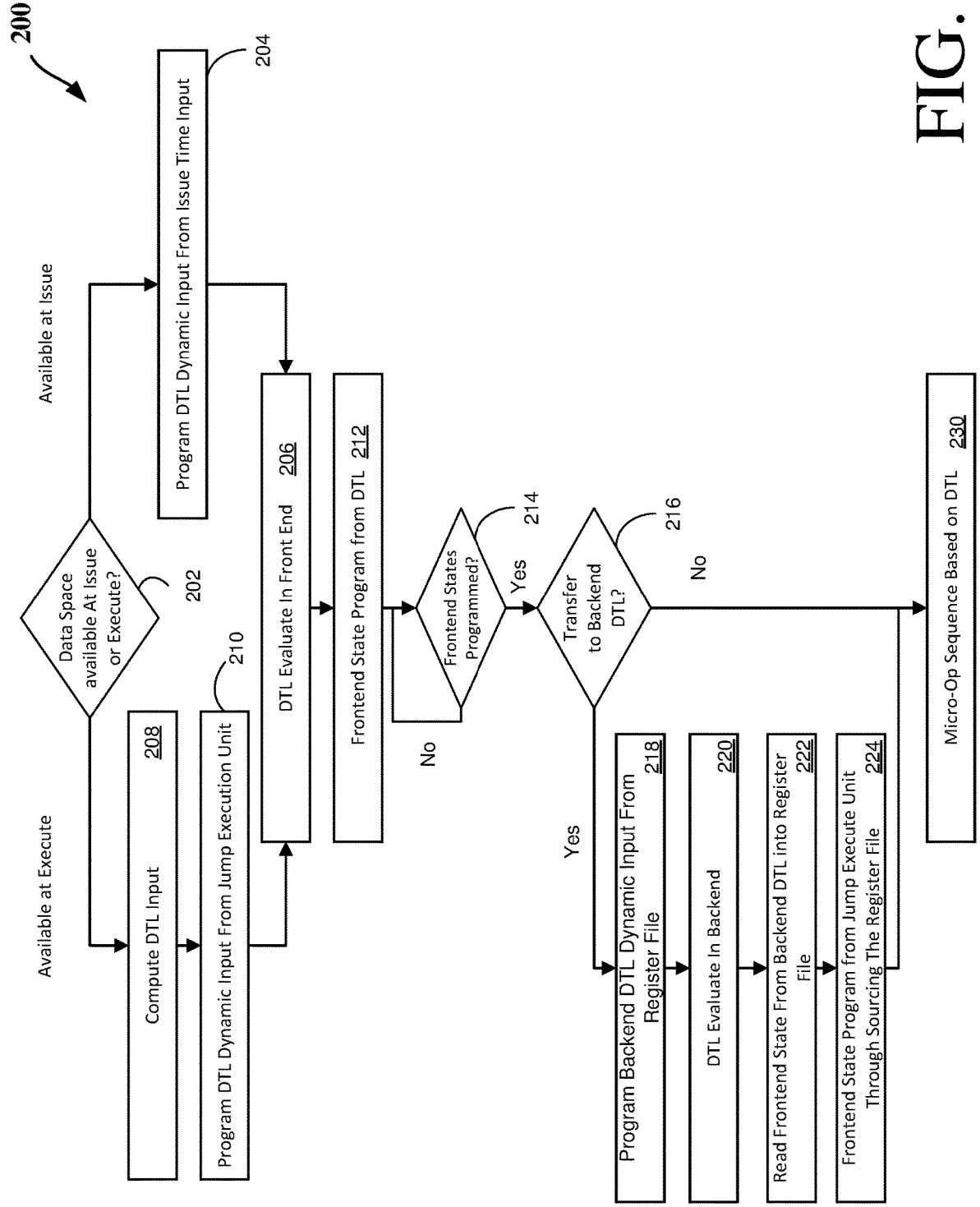
FIG. 2 illustrates a flow diagram of a method to provide issue, execution, and backend driven frontend translation control for performant and secure data-space guided micro-sequencing, according to an embodiment.

FIG. 2 illustrates a flow diagram of a method 200 to provide issue, execution, and backend driven frontend translation control for performant and secure data-space guided micro-sequencing, according to an embodiment. One or more of the operations of method 200 may be performed by one or more components of FIG. 1, such as discussed herein.

Referring to FIGS. 1 and 2, at an operation 202, it is determined whether data space is available at issue or on execution. If data is available at issue, operation 204 programs the DTL dynamic input, e.g., from issue time input. Operation 206 performs DTL evaluation in frontend. Alternatively, if data space is available at execution, operation 208 determines the DTL input. Operation 210 programs the DTL dynamic input from JEU and method 200 resumes at operation 206. Operation 212 programs the frontend state from the DTL.

At operation 214, it is determined whether the frontend state(s) have been programmed and once the front end state programming is done, operation 216 determines whether operations should be sent to the backend DTL. If so, operation 218 programs the backend DTL dynamic input from the register file 122. Operation 220 evaluates the DTL in the backend. Operation 222 reads the frontend state(s) from the backend DTL into the register file 122. Operation 224 programs the frontend state from JEU by sourcing data from the register file 122. Method 200 terminates at operation 230 which performs the micro-operation sequence based on the DTL information.

Figure 3:
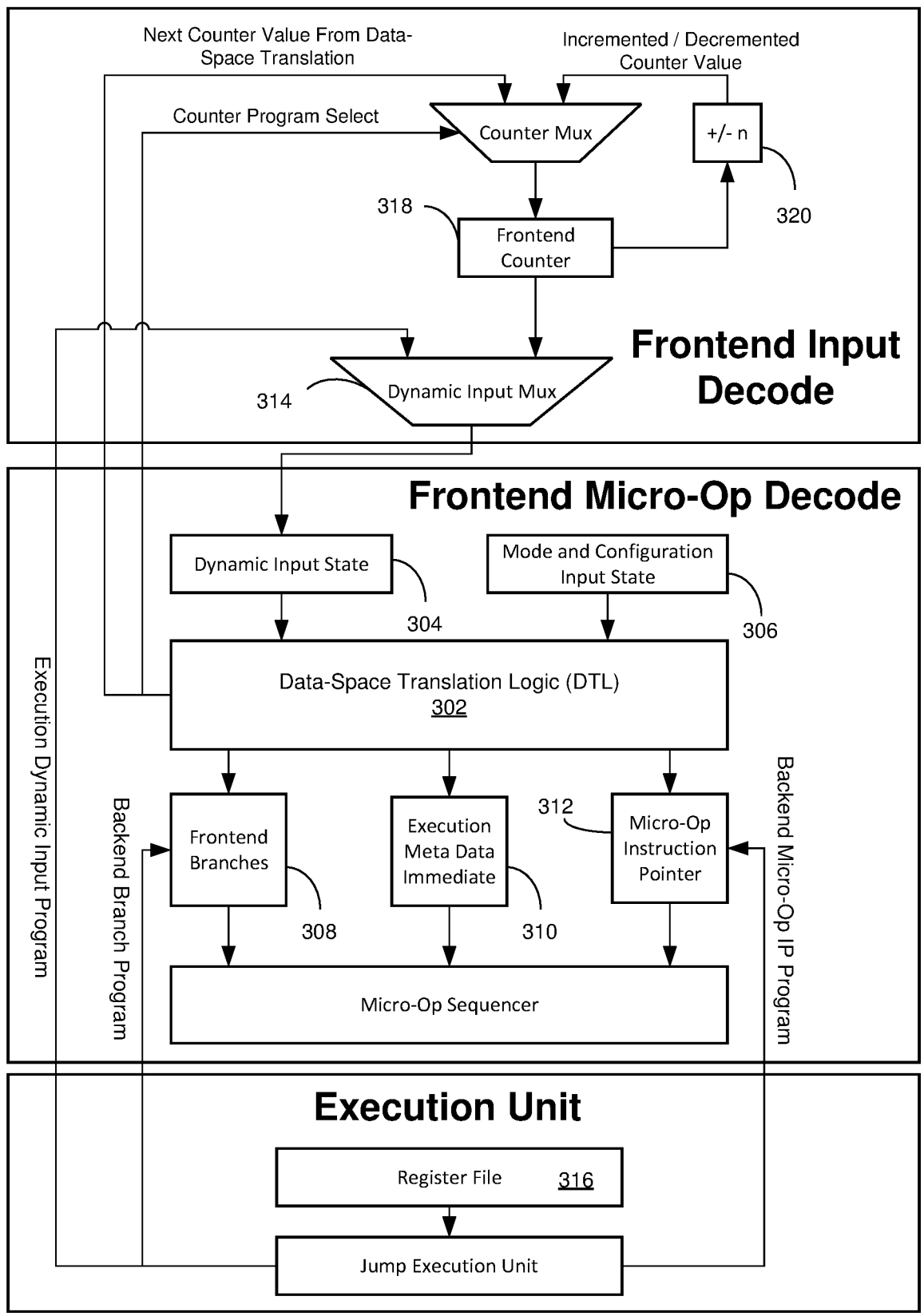
FIG. 3 illustrates a block diagram of components of a processor to provide loop driven region based frontend translation control for performant and secure data-space guided micro-sequencing, according to an embodiment.

FIG. 3 illustrates a block diagram of components of a processor to provide loop driven region based frontend translation control for performant and secure data-space guided micro-sequencing, according to an embodiment. Components of FIG. 1 work individually and in unison to reduce and mostly eliminate traditional serializing and mispredict prone micro-code algorithms for complex data driven instructions.

As shown in FIG. 3, an optimized data-space translation logic (DTL) 302 is provided in the frontend of a CPU (e.g., which may be the same or similar to the DTL 102 of FIGS. 1-2). This logic has a dynamic component 304 that is programmed on each lookup and a relatively static component such as mode and configuration input state 306. In one embodiment, DTL 302 is implemented as a programmable logic array (PLA). Other features of the DTL 302 may be the same or similar as discussed with reference to DTL 102 of FIGS. 1-2. Also, components of FIG. 3 not specifically discussed may be the same or similar to those components of FIG. 1 having the same or similar label.

An embodiment provides a mode to atomically program multiple outputs (frontend states) needed by a complex flow, such as frontend branch hints 308, immediate values 310, micro-operation instruction pointers 312.

For multiple micro-operation Instruction Pointer targets, once the DTL is invoked to program this state in the frontend, the instruction flow can use these as perfect indirect branch targets. The flow can jump to each of these in turn, with each target pointing to a different basic block. Since these targets have already been setup during the initial DTL lookup, all these basic blocks to be chained with no execution penalty without the need for a branch predictor, or the possibility of speculatively issuing micro-operations from the wrong basic block.

For frontend branches, a complex algorithm for an instruction typically has multiple decision points, and for many of those the decision for whether the branch should follow the taken or not-taken path depends on the data operands for the instruction. Since these data operands were programmed into the DTL's dynamic inputs, some of the DTL outputs can be setup to simply represent the control for whether that specific branch condition is true or false. Since these controls are setup in the frontend atomically during the initial DTL lookup, the branch can resolve taken versus not-taken perfectly on issue of the micro-operation. Again, this eliminates mispredictions and speculative execution of code sequences not relevant to the input data space.

For immediate values, the DTL can also produce multiple constant values specific to that instruction's dynamic input, which can be used as counts, shift amounts, masks, or simply data for results.

In an embodiment, a mode is provided where the programming of the DTL dynamic input at 314 can be done independent of frontend handler control programming. This independent control over clock allows the dynamic input and output flops for the DTL to effectively create a pipelining mode. This pipelining support allows data to be sent to the DTL dynamic inputs before the DTL output data has been consumed, thus enabling multiple steps in a complex algorithm to execute in parallel without serialization.

Each step (N, N+1, . . . ) of a complex data driven algorithm may require a different set of micro-operation IP pointers, frontend branch controls, and immediate values. The DTL dynamic input for the next step (N+1) may be available only from the backend of the processor by reading a register file (316) or the result of some previous operation and implies a certain latency to make its way from the backend of a deep out-of-order processor to the frontend. In a simple implementation, this implies a serialization at the end of step (N) while one waits for the frontend state to be programmed with the DTL lookup results for step (N+1).

This approach is valuable since it keeps the frontend state corresponding to (N) at the output of the DTL stable, and operations can continue by starting working on computing and writing the input corresponding to (N+1) to the DTL dynamic input flops. The latency of this dynamic input programming may be partially or fully hidden by the latency of the micro-operations for the various handlers corresponding to step (N). By the time the end of step (N) is reached, a wait is only needed until a confirmation is received that the dynamic input for (N+1) has been programmed. This indication is another frontend branch control that is cleared when step (N) started, and which is set when the input for (N+1) reaches the dynamic input flops.

An embodiment provides the ability to connect a state machine (counter) to the dynamic DTL input. The processor supports a counter 318 in the frontend of the machine, with a control 320 to increment/decrement the counter and an ability to detect if the counter overflows. This counter is a state machine with an initial value, and a termination condition, and can for example be used to avoid a mispredict at the end of a loop. In turn, a new special mode of the DTL uses this loop counter (or more complex state machine) as the DTL dynamic input via multiplexer 314. The control that changes the counter also triggers frontend handler control programming. This becomes an even more performant way than the prior mode to chain multiple algorithmic steps together in sequence.

This allows multiple stages of output DTL data for a single original input. Once one step of the algorithm is done, the state machine dynamic input increments without serialization or reprogramming, thus allowing the DTL output to control the next step of the algorithm.

Another embodiment provides a mode where the DTL output for input "n" from the state machine also provides the value of the next state input. Instead of always incrementing the DTL dynamic input "N" to the next value "N+1", this provides a way to skip iterations or micro-operation code block regions of the algorithm based on the original input operand and mode. Many complex instructions share this common characteristic of being sequences of simple basic blocks, but some of those steps may be skipped based on the instruction operands or mode inputs. A classic example is all kinds of flows that save and restore state, such as context switch flows, VMEntry, VMExit, SMI, RSM, reset, C6, PEBS, and various tracing and debug flows. Each of these flows can be simply described as a sequence of N steps, where step N may read or write state X, with possibly some special handling beyond a simple state read or write. An embodiment programs the micro-operation IP pointers, state IDs (identifiers), branch controls that indicate special handling for each of the N steps into the DTL and let the loop counter decrement from N to 0. This allows for skipping, without mispredicts or delays, the steps that are not appropriate for this instance.

The entire complexity of this sequence is thus reduced to an input mode/data-based sequence of parametrized basic blocks. This allows for maximal reuse of each basic block for all kinds of unrelated instructions, reducing overall micro code size and redundancy.

With respect to functional correctness, verifiability, security, area, and performance, encoding the algorithm of a complex flow in the manner discussed herein, e.g., as an ordered list of basic blocks, also has a benefit in terms of functional correctness. Once the tool flow that generates the DTL is proven to work, the only remaining functional bugs if any are related to whether the instruction specification was correctly translated into the DTL input specification. This is a much simpler problem to verify correctness at compilation time, and greatly reduces the need and possibility of run time testing of these complex flows finding functional bugs.

Once the data dependent frontend controls for an algorithm step are set up, there is no question of a mispredict or speculatively issuing or executing incorrect micro-operations; and hence no need to serialize against speculative paths. This solution scales to flows with hundreds of decision points. Hence, embodiments are able to significantly reduce traditional serializing and mispredict prone microcode algorithms. Trading off DTL area versus the micro-operation based flow results in an overall reduction in the size and complexity of the complex flow implementation by restructuring it as a set of generic basic blocks controlled by the DTL. Maximizing reuse of every generic basic block also helps reduce patch cost, since less patch matches are required to intercept all similar blocks. These inventions are some of the primary techniques to optimize and simplify complex ISA implementation for current and future cores.

Figure 4:
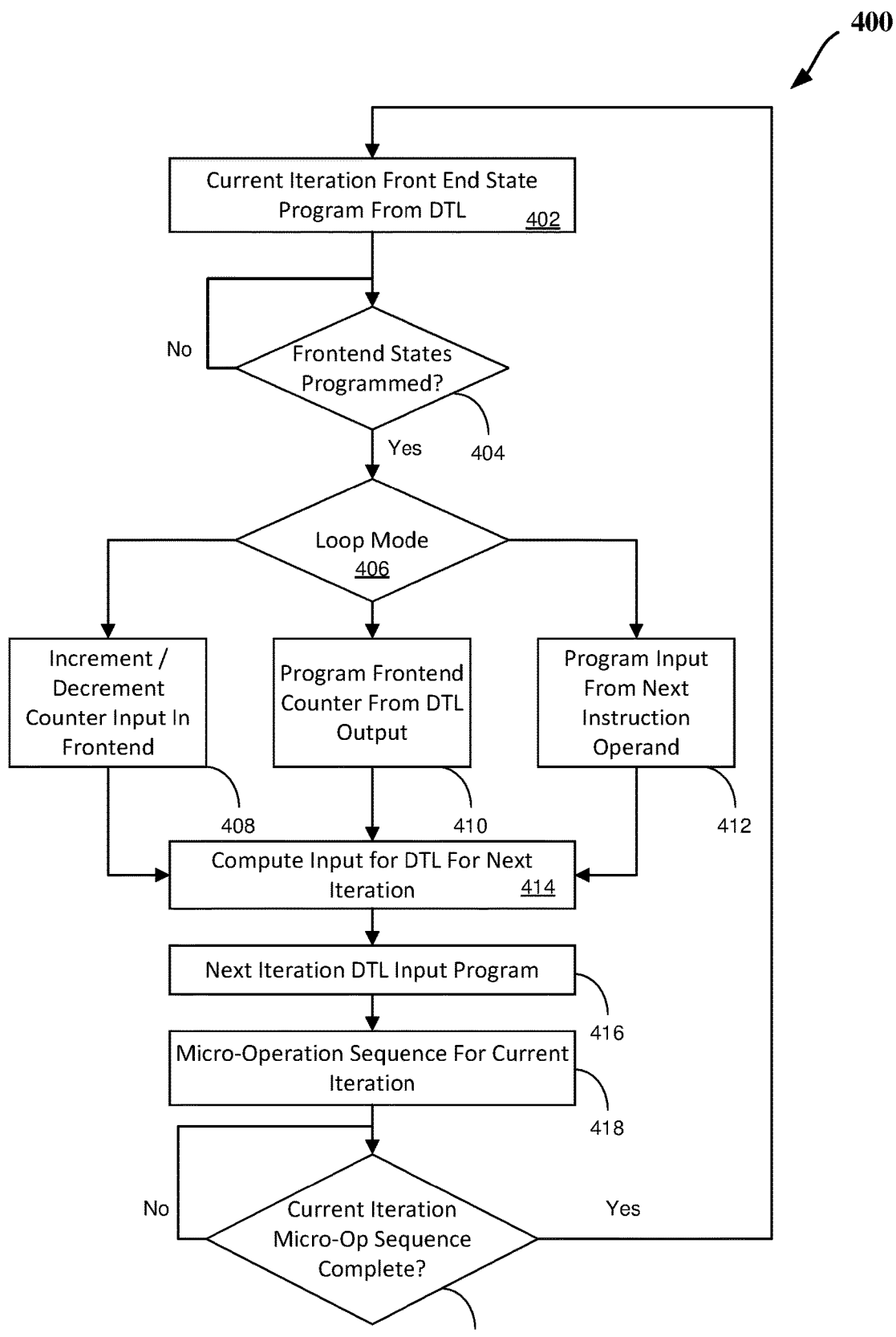
FIG. 4 illustrates a flow diagram of a method to provide loop driven region based frontend translation control for performant and secure data-space guided micro-sequencing, according to an embodiment.

FIG. 4 illustrates a flow diagram of a method 400 to provide loop driven region based frontend translation control for performant and secure data-space guided microsequencing, according to an embodiment. One or more of the operations of method 400 may be performed by one or more components of FIG. 3, such as discussed herein.

Referring to FIGS. 3-4, operation 402 allows the DTL 302 to program the current iteration front end state. Once the frontend states are programmed (as determined at operation 404), operation 406 handles the various modes. Operation 408 increments/decrements the frontend counter 318, operation 410 programs the frontend counter 318 from DTL output, operation 412 programs input from next iteration operand. Operation 414 computes input for the DTL 302 for the next iteration. Operation 416 programs the input for the next iteration of the DTL. Operation 418 performs the micro-operation sequence for the current iteration. Method 400 keeps performing operation 420 to determine whether the current iteration micro-operation sequence is complete at which point method 400 resumes at operation 402.

Additionally, some embodiments may be applied in computing systems that include one or more processors (e.g., where the one or more processors may include one or more processor cores), such as those discussed with reference to FIG. 1 et seq., including for example a desktop computer, a work station, a computer server, a server blade, or a mobile computing device. The mobile computing device may include a smartphone, tablet, UMPC (Ultra-Mobile Personal Computer), laptop computer, Ultrabook™ computing device, wearable devices (such as a smart watch, smart ring, smart bracelet, or smart glasses), etc.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 5A is a block diagram illustrating an exemplary instruction format according to embodiments. FIG. 5A shows an instruction format 500 that is specific in the sense that it specifies the location, size, interpretation, and order of the fields, as well as values for some of those fields. The instruction format 500 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 502—is encoded in a four-byte form.

Format Field 582 (EVEX Byte 0, bits [7:0])—the first byte (EVEX Byte 0) is the format field 582 and it contains 0x62 (the unique value used for distinguishing the vector friendly instruction format in one embodiment).

The second-fourth bytes (EVEX Bytes 1-3) include a number of bit fields providing specific capability.

REX field 505 (EVEX Byte 1, bits [7-5])—consists of a EVEX.R bit field (EVEX Byte 1, bit [7]—R), EVEX.X bit field (EVEX byte 1, bit [6]—X), and 557BEX byte 1, bit[5]—B). The EVEX.R, EVEX.X, and EVEX.B bit fields provide the same functionality as the corresponding VEX bit fields, and are encoded using is complement form, i.e., ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field QAc10—this is the EVEX.R' bit field (EVEX Byte 1, bit [4]—R') that is used to encode either the upper 7 or lower 7 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 7 registers. In other words, R'Rrrr is formed by combining EVEX.R', EVEX.R, and the other RRR from other fields.

Opcode map field 515 (EVEX byte 1, bits [3:0]—mmmm)—its content encodes an implied leading opcode byte (0F, 0F 38, or 0F 3).

Data element width field 564 (EVEX byte 2, bit [7]—W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 520 (EVEX Byte 2, bits [6:3]-vvvv)—the role of EVEX.vvvv may include the following: 1)

EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 520 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]-U)—If EVEX.U=0, it indicates class A (support merging-writemasking) or EVEX.U0; if EVEX.U=1, it indicates class B (support zeroing and merging-writemasking) or EVEX.U1.

Prefix encoding field 525 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 553 (EVEX byte 3, bit [7]—EH; also known as EVEX.EH, EVEX.rs, EVEX.RL, EVEX.writemask control, and EVEX.N; also illustrated with α)—its content distinguishes which one of the different augmentation operation types are to be performed.

Beta field 555 (EVEX byte 3, bits [6:4]-SSS, also known as EVEX.s2-0, EVEX.r2-0, EVEX.rr1, EVEX.LL0, EVEX.LLB; also illustrated with βββ)—distinguishes which of the operations of a specified type are to be performed.

REX' field 510—this is the remainder of the REX' field and is the EVEX.V' bit field (EVEX Byte 3, bit [3]—V') that may be used to encode either the upper 7 or lower 7 of the extended 32 register set. This bit is stored in bit inverted format. A value of 1 is used to encode the lower 7 registers. In other words, V'VVVV is formed by combining EVEX.V', EVEX.vvvv.

Writemask field 571 (EVEX byte 3, bits [2:0]-kkk)—its content specifies the index of a register in the writemask registers. In one embodiment, the specific value EVEX kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 571 allows for partial vector operations, including loads, stores, arithmetic, logical, etc. While embodiments are described in which the writemask field's 571 content selects one of a number of writemask registers that contains the writemask to be used (and thus the writemask field's 571 content indirectly identifies that masking to be performed), alternative embodiments instead or additional allow the mask write field's 571 content to directly specify the masking to be performed.

Real Opcode Field 530 (Byte 4) is also known as the opcode byte. Part of the opcode is specified in this field.

MOD R/M Field 540 (Byte 5) includes MOD field 542, register index field 544, and R/M field 546. The MOD field's 542 content distinguishes between memory access and non-memory access operations. The role of register index field 544 can be summarized to two situations: encoding either the destination register operand or a source register operand, or be treated as an opcode extension and not used to encode any instruction operand. The content of register index field 544, directly or through address generation, specifies the locations of the source and destination operands, be they in registers or in memory. These include a sufficient number of bits to select N registers from a PxQ (e.g., 32×512, 7×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 546 may include the following: encoding the instruction operand that references a memory address, or encoding either the destination register operand or a source register operand.

Scale, Index, Base (SIB) Byte (Byte 6)—The scale field's 550 content allows for the scaling of the index field's content for memory address generation (e.g., for address generation that uses 2scale*index+base). SIB.xxx 554 and SIB.bbb 556—the contents of these fields have been previously referred to with regard to the register indexes Xxxx and Bbbb.

Displacement field 563A (Bytes 7-10)—when MOD field 542 contains 10, bytes 7-10 are the displacement field 563A, and it works the same as the legacy 32-bit displacement (disp32) and works at byte granularity. This may be used as part of memory address generation (e.g., for address generation that uses 2scale*index+base+displacement).

Displacement factor field 563B (Byte 7)—when MOD field 542 contains 01, byte 7 is the displacement factor field 563B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 563B is a reinterpretation of disp8; when using displacement factor field 563B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 563B substitutes the legacy x86 instruction set 8-bit displacement. Thus, the displacement factor field 563B is encoded the same way as an x86 instruction set 8-bit displacement (so no changes in the Mod RM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 572 allows for the specification of an immediate. This field is optional in the sense that is it not present in an implementation of the generic vector friendly format that does not support immediate and it is not present in instructions that do not use an immediate.

Full Opcode Field

FIG. 5B is a block diagram illustrating the fields of the instruction format 500 that make up the full opcode field 574 according to one embodiment. Specifically, the full opcode field 574 includes the format field 582, the base operation field 543, and the data element width (W) field 563. The base operation field 543 includes the prefix encoding field 525, the opcode map field 515, and the real opcode field 530.

Register Index Field

FIG. 5C is a block diagram illustrating the fields of the format 500 that make up the register index field 545 according to one embodiment. Specifically, the register index field 545 includes the REX field 505, the REX' field 510, the MODR/M.reg field 544, the MODR/M.r/m field 546, the VVVV field 520, xxx field 554, and the bbb field 556.

Augmentation Operation Field

Figure 5D:
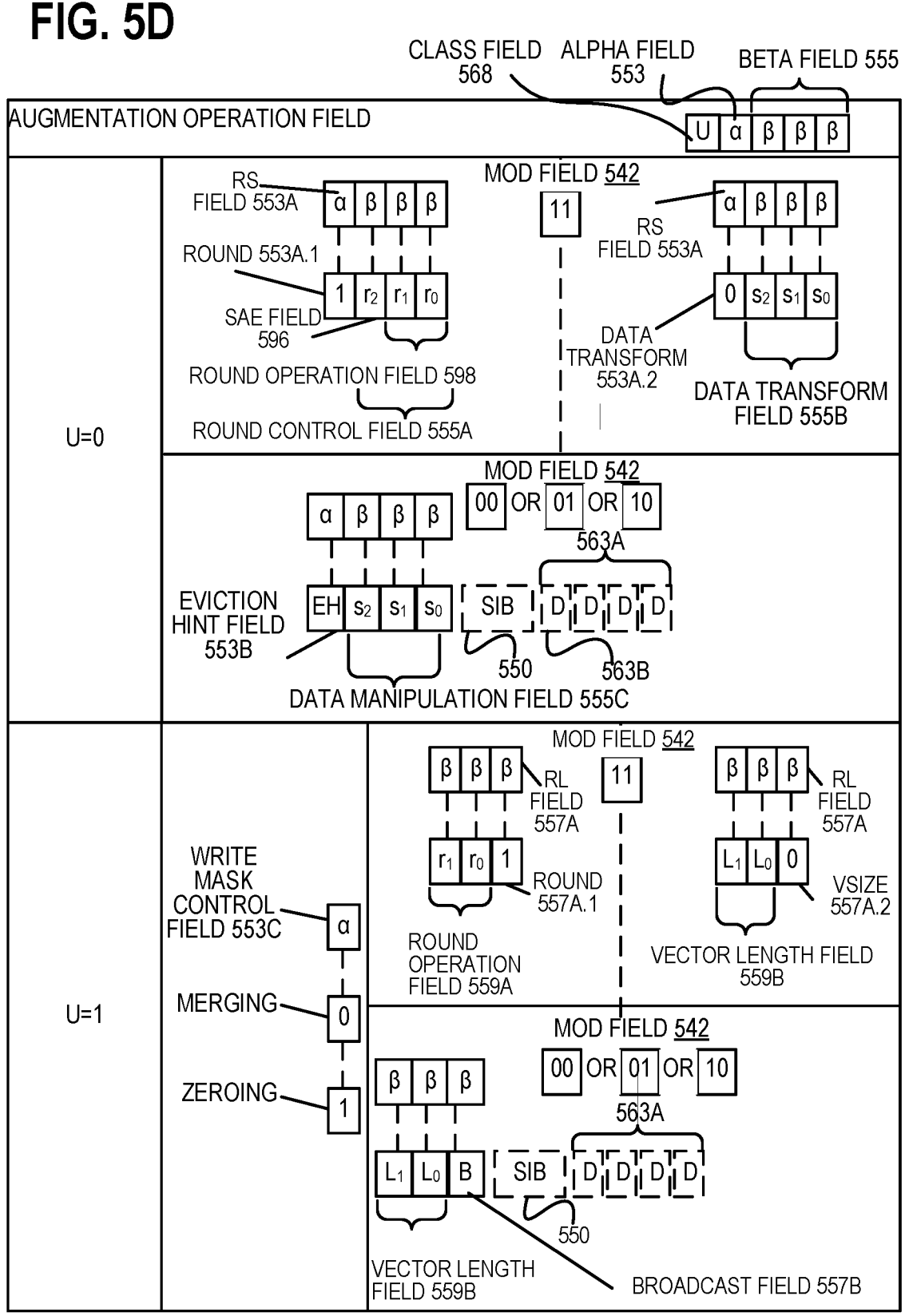
FIG. 5D is a block diagram illustrating the fields of the instruction format that make up the augmentation operation field according to one embodiment.

FIG. 5D is a block diagram illustrating the fields of the instruction format 500 that make up an augmentation operation field according to one embodiment. When the class (U) field 568 contains 0, it signifies EVEX.U0 (class A 568A); when it contains 1, it signifies EVEX.U1 (class B 568B). When U=0 and the MOD field 542 contains 11 (signifying a no memory access operation), the alpha field 553 (EVEX byte 3, bit [7]—EH) is interpreted as the rs field 553A. When the rs field 553A contains a 1 (round 553A.1), the beta field 555 (EVEX byte 3, bits [6:4]-SSS) is interpreted as the round control field 555A. The round control field 555A includes a one bit SAE field 596 and a two bit round operation field 598. When the rs field 553A contains a 0 (data transform 553A.2), the beta field 555 (EVEX byte 3, bits [6:4]-SSS) is interpreted as a three bit data transform field 555B. When U=0 and the MOD field 542 contains 00, 01, or 10 (signifying a memory access operation), the alpha field 553 (EVEX byte 3, bit [7]—EH) is interpreted as the eviction hint (EH) field 553B and the beta field 555 (EVEX byte 3, bits [6:4]-SSS) is interpreted as a three bit data manipulation field 555C.

When U=1, the alpha field 553 (EVEX byte 3, bit [7]—EH) is interpreted as the writemask control (Z) field 553C. When U=1 and the MOD field 542 contains 11 (signifying a no memory access operation), part of the beta field 555 (EVEX byte 3, bit [4]-S0) is interpreted as the RL field 557A; when it contains a 1 (round 557A.1) the rest of the beta field 555 (EVEX byte 3, bit [6-5]-S2-1) is interpreted as the round operation field 559A, while when the RL field 557A contains a 0 (VSIZE 557.A2) the rest of the beta field 555 (EVEX byte 3, bit [6-5]-S2-1) is interpreted as the vector length field 559B (EVEX byte 3, bit [6-5]-L1-0). When U=1 and the MOD field 542 contains 00, 01, or 10 (signifying a memory access operation), the beta field 555 (EVEX byte 3, bits [6:4]-SSS) is interpreted as the vector length field 559B (EVEX byte 3, bit [6-5]-L1-0) and the broadcast field 557B (EVEX byte 3, bit [4]-B).

Exemplary Register Architecture

Figure 6:
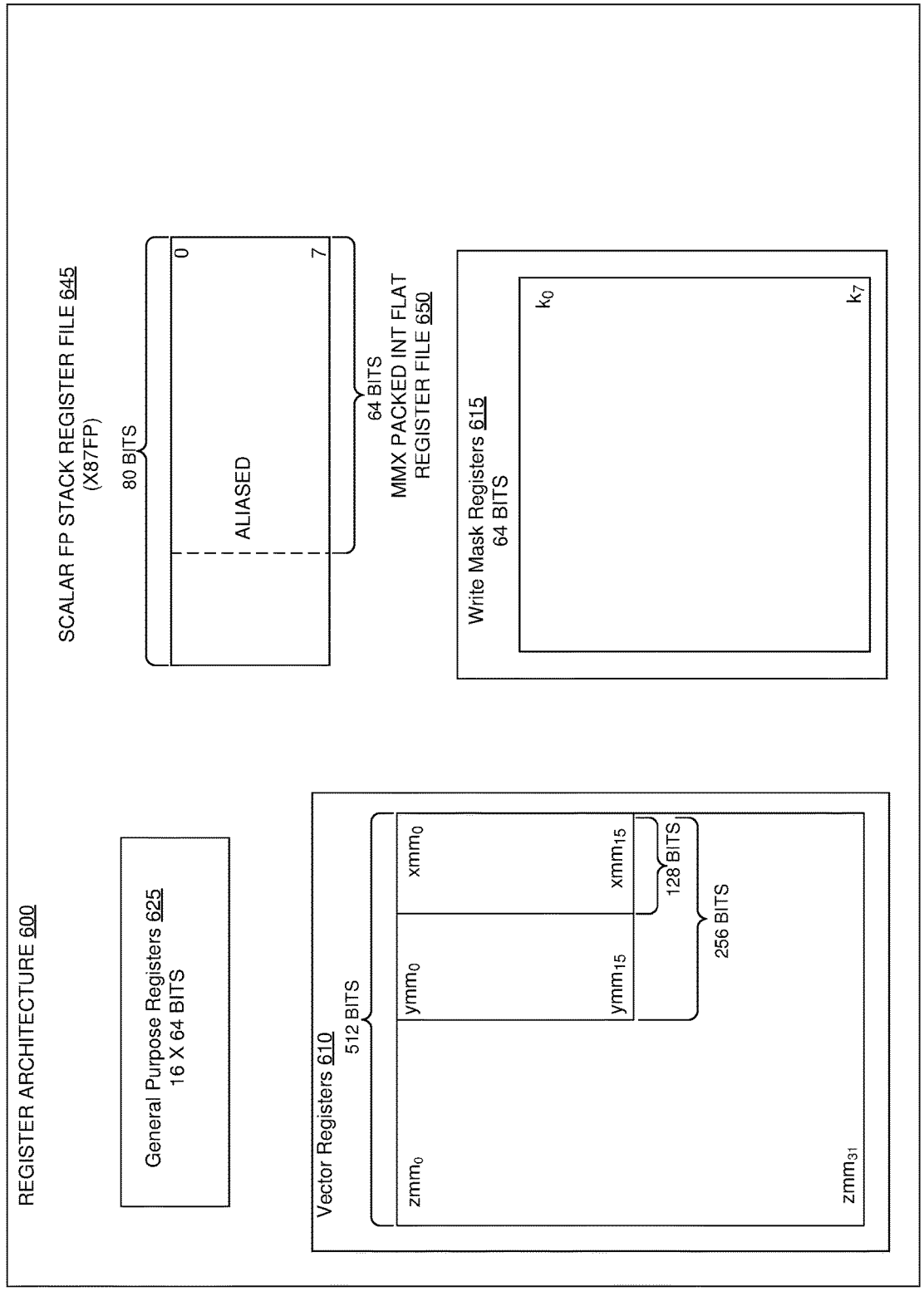
FIG. 6 is a block diagram of a register architecture according to one embodiment.

FIG. 6 is a block diagram of a register architecture 600 according to one embodiment. In the embodiment illustrated, there are 32 vector registers 610 that are 512 bits wide; these registers are referenced as ZMM0 through ZMM31. The lower order 256 bits of the lower 7 ZMM registers are overlaid on registers YMM0-16. The lower order 128 bits of the lower 7 ZMM registers (the lower order 128 bits of the YMM registers) are overlaid on registers XMM0-15. In other words, the vector length field 459B selects between a maximum length and one or more other shorter lengths, where each such shorter length is half the length of the preceding length; and instructions templates without the vector length field 459B operate on the maximum vector length. Further, in one embodiment, the class B instruction templates of the instruction format 400 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 615—in the embodiment illustrated, there are 8 writemask registers (k0 through k7), each 64 bits in size. In an alternate embodiment, the writemask registers 615 are 7 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 625—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 645, on which is aliased the MMX packed integer flat register file 650—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU (Central Processing Unit) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

Figures 7A, 7B:
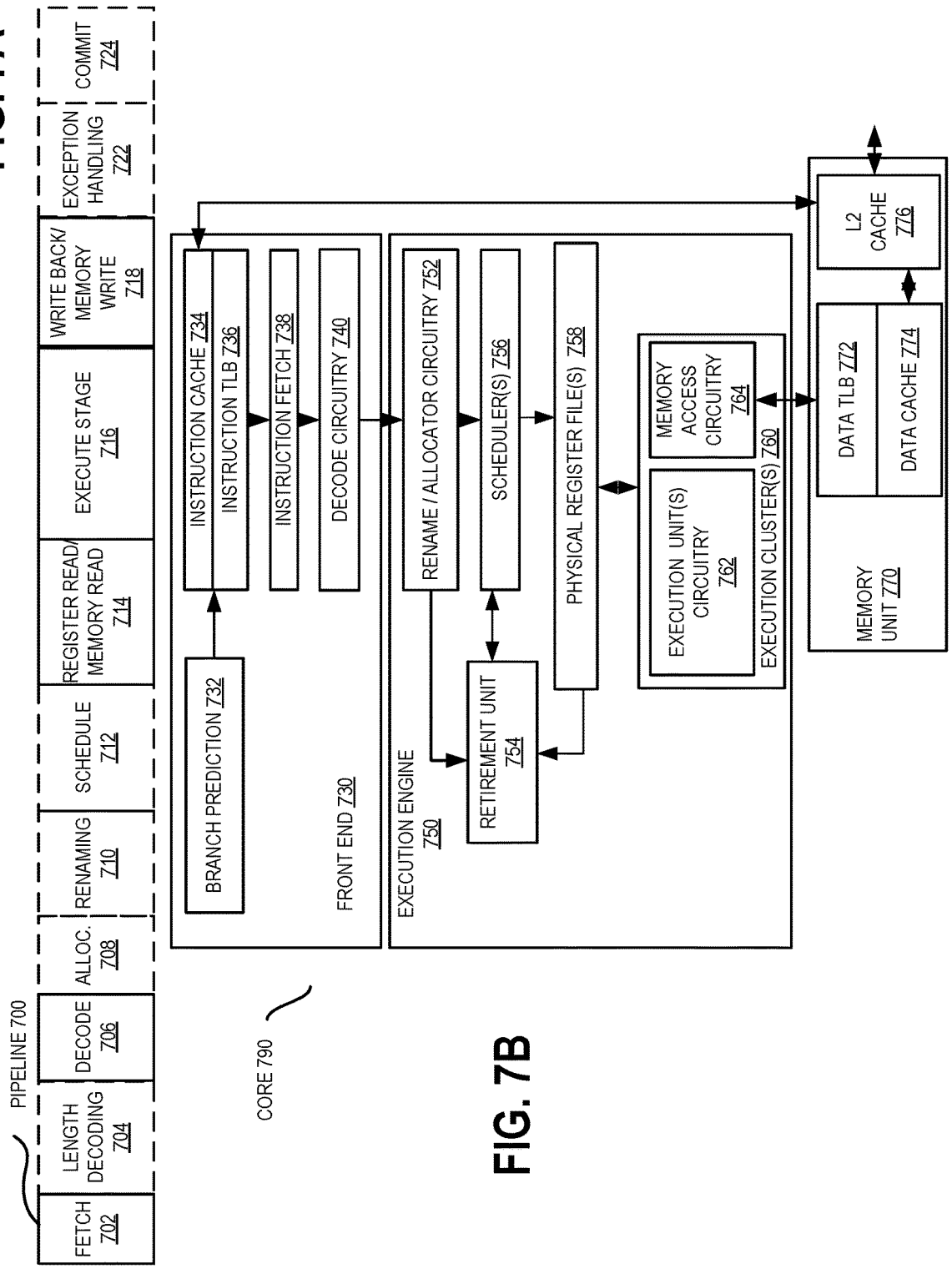
FIG. 7A is a block diagram illustrating both an exemplary in-order pipeline and an exemplary register renaming, out-of-order issue/execution pipeline according to embodiments.
FIG. 7B is a block diagram illustrating both an exemplary embodiment of an in-order architecture core and an exemplary register renaming, out-of-order issue/execution architecture core to be included in a processor according to embodiments.

FIG. 7A is a block diagram illustrating both an exemplary in-order pipeline and an exemplary register renaming, out-of-order issue/execution pipeline according to embodiments. FIG. 7B is a block diagram illustrating both an exemplary embodiment of an in-order architecture core and an exemplary register renaming, out-of-order issue/execution architecture core to be included in a processor according to embodiments. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a writemask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

Figure 8:
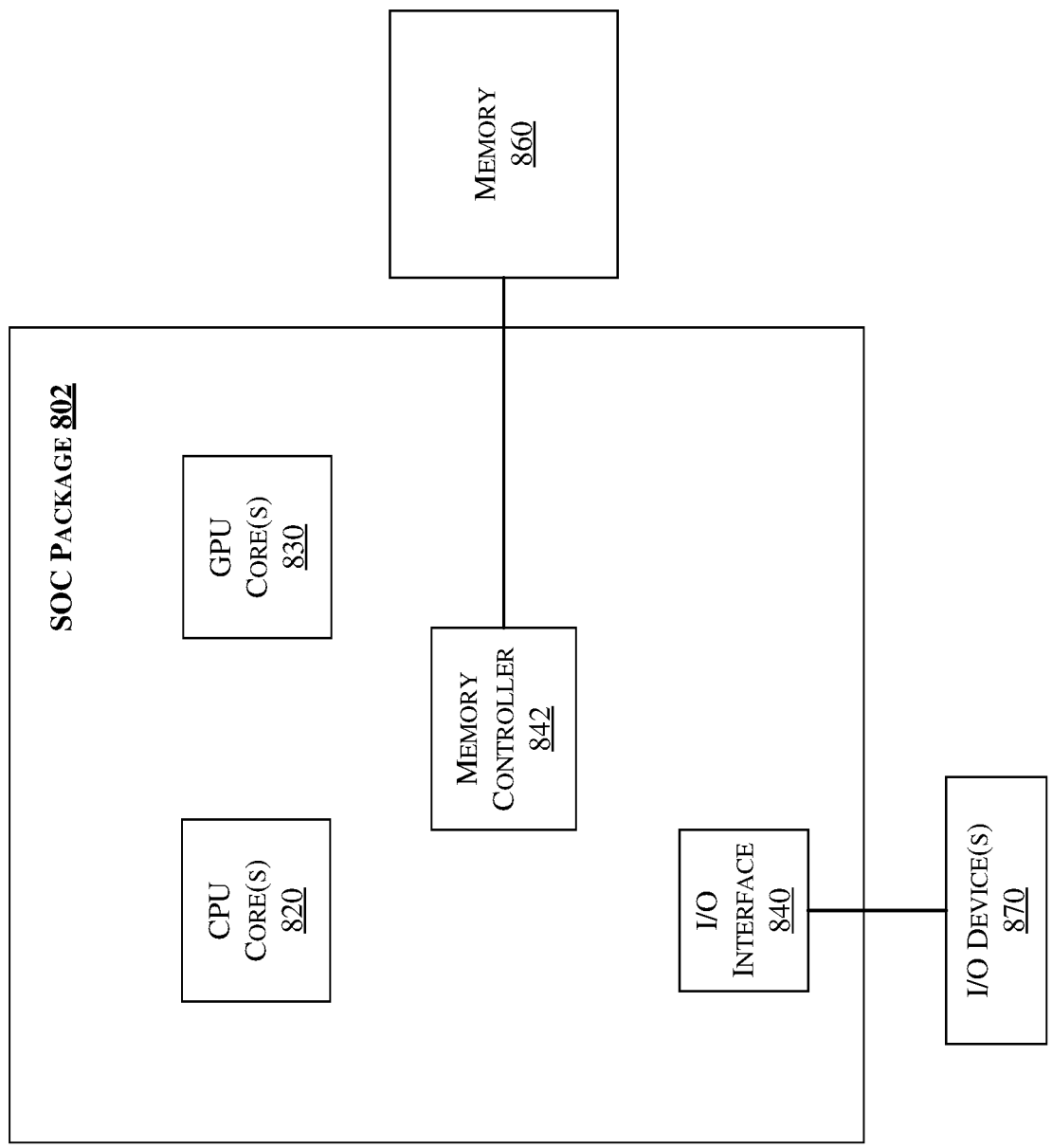
FIG. 8 illustrates a block diagram of an SOC (System On Chip) package in accordance with an embodiment.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 802 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
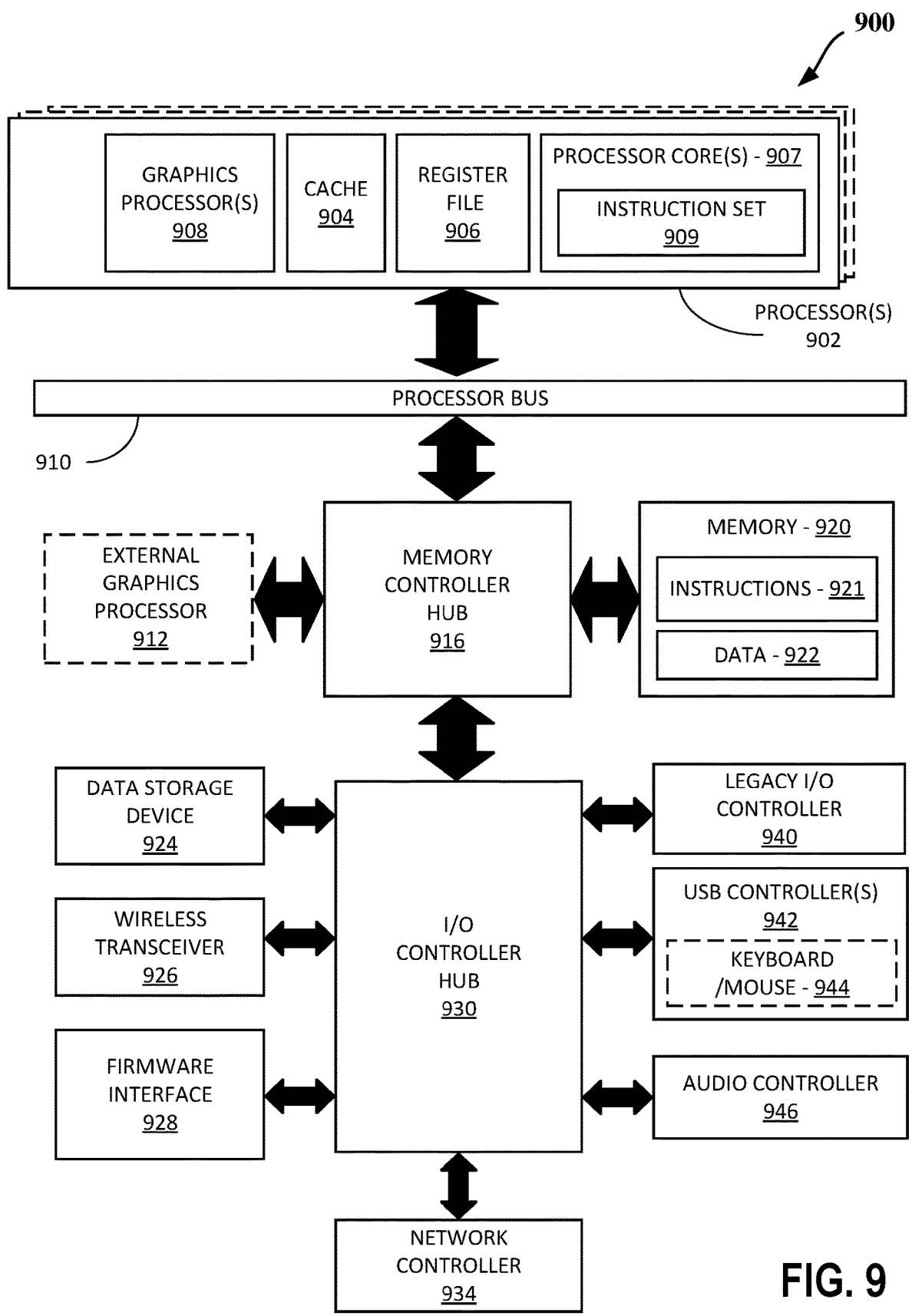
FIG. 9 is a block diagram of a processing system, according to an embodiment.

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
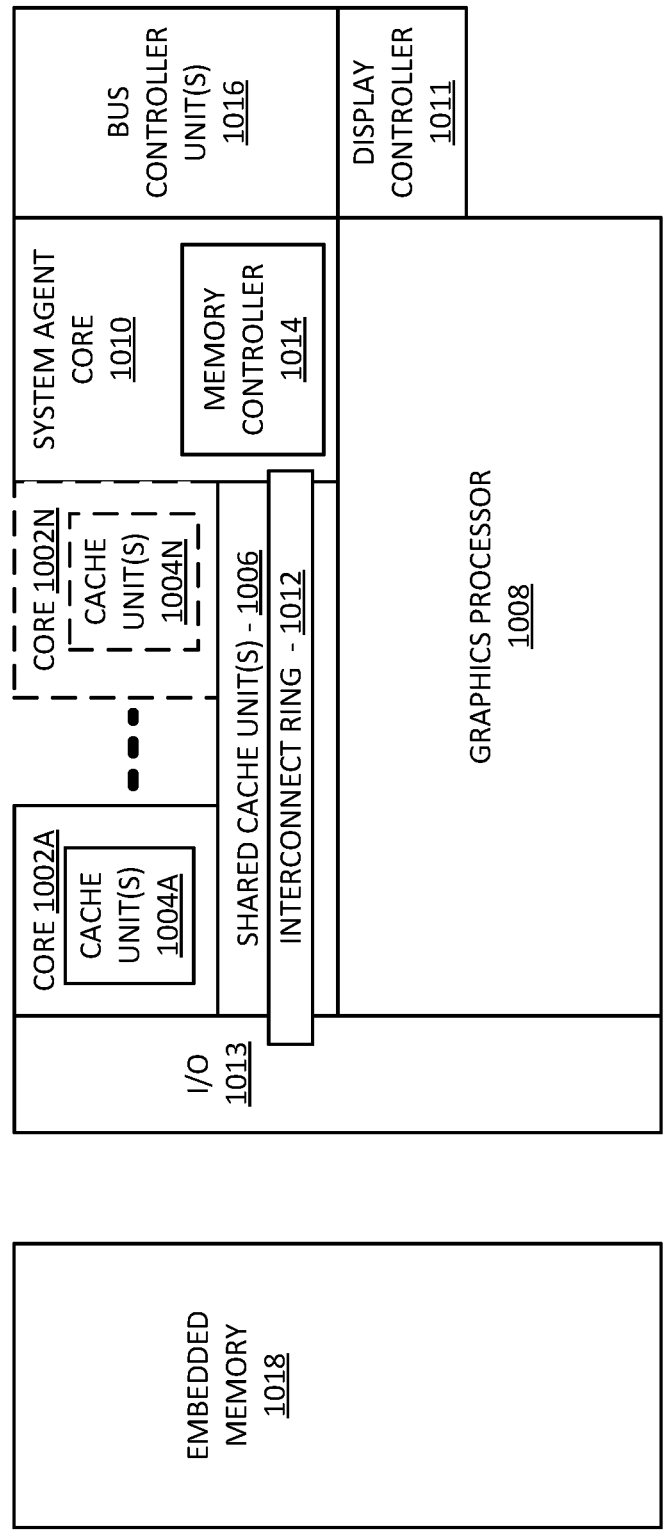
FIG. 10 is a block diagram of an embodiment of a processor having one or more processor cores, according to some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
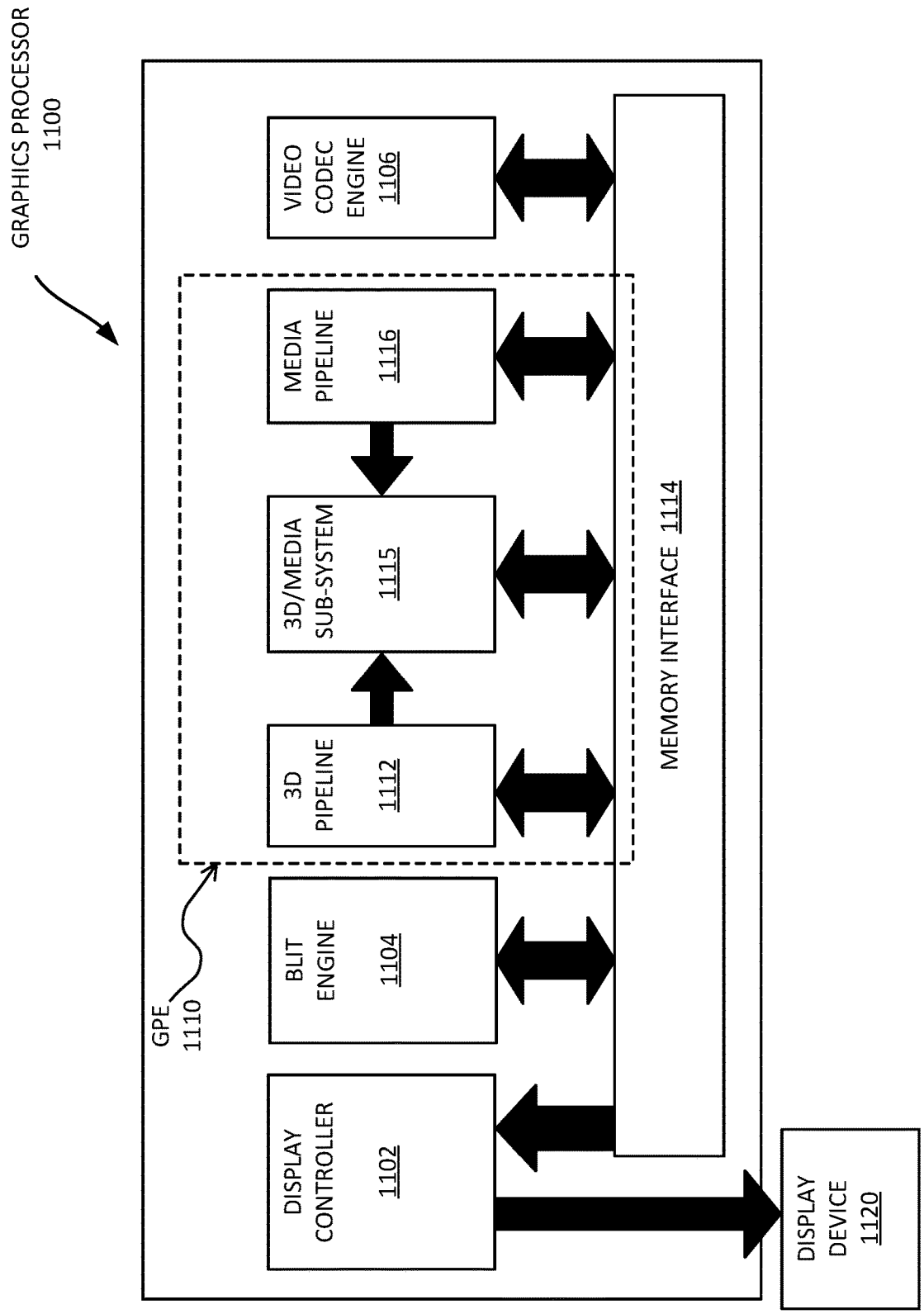
FIG. 11 is a block diagram of a graphics processor, according to an embodiment.

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 321M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 3D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media sub-system 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

The following examples pertain to further embodiments. Example 1 includes an apparatus comprising: Data-space Translation Logic (DTL) circuitry to receive a static input and a dynamic input and to generate one or more outputs based at least in part on the static input and the dynamic input; and a frontend counter to generate a count value for the dynamic input based at least in part on an incremented/decremented counter value and a next counter value from the DTL circuitry, wherein the DTL circuitry is capable to receive a new dynamic input prior to consumption of the one or more outputs. Example 2 includes the apparatus of example 1, wherein the DTL circuitry is to cause a selection between the incremented/decremented counter value and the next counter value. Example 3 includes the apparatus of example 2, wherein the selection between the incremented/decremented counter value and the next counter value is to allow for skipping of an iteration or a code block region. Example 4 includes the apparatus of example 1, wherein the DTL circuitry is to generate the one or more outputs prior to commencement of speculation operations in a processor. Example 5 includes the apparatus of example 4, wherein a frontend of the processor comprises the DTL circuitry. Example 6 includes the apparatus of example 1, wherein the DTL circuitry comprises a Programmable Logic Array (PLA). Example 7 includes the apparatus of example 1, further comprising a Jump Execution Unit (JEU) to send data from a register file for the dynamic input of the DTL circuitry. Example 8 includes the apparatus of example 7, wherein the JEU is to block data associated with a mispredicted path to be sent for the dynamic input of the DTL circuitry. Example 9 includes the apparatus of example 1, wherein the one or more outputs comprise one or more of: a frontend branch hint, an immediate value, and a micro-operation instruction pointer. Example 10 includes the apparatus of example 1, wherein the DTL circuitry is to atomically program the one or more outputs comprising: a frontend branch hint, an immediate value, and a micro-operation instruction pointer. Example 11 includes the apparatus of example 1, wherein the static input is to indicate a mode of operation for the DTL circuitry. Example 12 includes the apparatus of example 1, wherein the dynamic input is to change for each instruction. Example 13 includes the apparatus of example 1, wherein the dynamic input is to be provided based at least in part on an operand of an instruction. Example 14 includes the apparatus of example 1, wherein a plurality of processor cores of the processor are to share the DTL circuitry.

Example 15 includes an apparatus comprising: Data-space Translation Logic (DTL) circuitry to receive a static input and a dynamic input and to generate one or more outputs based at least in part on the static input and the dynamic input; a frontend counter to generate a count value for the dynamic input based at least in part on an incremented/decremented counter value and a next counter value from the DTL circuitry; decode circuitry to decode an instruction having a field for an operand value; and execution circuitry to execute the decoded instruction to provide the dynamic input based at least in part on the operand value. Example 16 includes the apparatus of example 15, wherein the DTL circuitry is capable to receive a new dynamic input prior to consumption of the one or more outputs. Example 17 includes the apparatus of example 15, wherein the DTL circuitry is to cause a selection between the incremented/decremented counter value and the next counter value. Example 18 includes the apparatus of example 17, wherein the selection between the incremented/decremented counter value and the next counter value is to allow for skipping of an iteration or a code block region. Example 19 includes the apparatus of example 15, wherein the DTL circuitry is to generate the one or more outputs prior to commencement of speculation operations in a processor. Example 20 includes the apparatus of example 19, wherein a frontend of the processor comprises the DTL circuitry. Example 21 includes the apparatus of example 15, further comprising a Jump Execution Unit (JEU) to send data from a register file for the dynamic input of the DTL circuitry. Example 22 includes the apparatus of example 15, wherein the one or more outputs comprise one or more of: a frontend branch hint, an immediate value, and a micro-operation instruction pointer.

Example 23 includes one or more non-transitory computer-readable media comprising one or more instructions that when executed on a processor configure the processor to perform one or more operations to cause: Data-space Translation Logic (DTL) circuitry to receive a static input and a dynamic input and to generate one or more outputs based at least in part on the static input and the dynamic input; a frontend counter to generate a count value for the dynamic input based at least in part on an incremented/decremented counter value and a next counter value from the DTL circuitry; decode circuitry to decode an instruction having a field for an operand value; and execution circuitry to execute the decoded instruction to provide the dynamic input based at least in part on the operand value. Example 24 includes the one or more computer-readable media of example 23, further comprising one or more instructions that when executed on the at least one processor configure the at least one processor to perform one or more operations to cause the DTL circuitry to receive a new dynamic input prior to consumption of the one or more outputs. Example 25 includes the one or more computer-readable media of example 23, further comprising one or more instructions that when executed on the at least one processor configure the at least one processor to perform one or more operations to cause the DTL circuitry to effect a selection between the incremented/decremented counter value and the next counter value.

Example 26 includes an apparatus comprising means to perform a method as set forth in any preceding example. Example 27 includes machine-readable storage including machine-readable instructions, when executed, to implement a method or realize an apparatus as set forth in any preceding example.

In various embodiments, one or more operations discussed with reference to FIG. 1 et seq. may be performed by one or more components (interchangeably referred to herein as "logic") discussed with reference to any of the figures.

In various embodiments, the operations discussed herein, e.g., with reference to FIG. 1 et seq., may be implemented as hardware (e.g., logic circuitry), software, firmware, or combinations thereof, which may be provided as a computer program product, e.g., including one or more tangible (e.g., non-transitory) machine-readable or computer-readable media having stored thereon instructions (or software procedures) used to program a computer to perform a process discussed herein. The machine-readable medium may include a storage device such as those discussed with respect to the figures.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    Data-space Translation Logic (DTL) circuitry to receive a static input and a dynamic input and to generate one or more outputs based at least in part on the static input and the dynamic input; and
    a frontend counter to generate a count value for the dynamic input based at least in part on an incremented/decremented counter value and a next counter value from the DTL circuitry,
    wherein the DTL circuitry is capable to receive a new dynamic input prior to consumption of the one or more outputs.

2. The apparatus of claim 1, wherein the DTL circuitry is to cause a selection between the incremented/decremented counter value and the next counter value.

3. The apparatus of claim 2, wherein the selection between the incremented/decremented counter value and the next counter value is to allow for skipping of an iteration or a code block region.

4. The apparatus of claim 1, wherein the DTL circuitry is to generate the one or more outputs prior to commencement of speculation operations in a processor.

5. The apparatus of claim 4, wherein a frontend of the processor comprises the DTL circuitry.

6. The apparatus of claim 1, wherein the DTL circuitry comprises a Programmable Logic Array (PLA).

7. The apparatus of claim 1, further comprising a Jump Execution Unit (JEU) to send data from a register file for the dynamic input of the DTL circuitry.

8. The apparatus of claim 7, wherein the JEU is to block data associated with a mispredicted path to be sent for the dynamic input of the DTL circuitry.

9. The apparatus of claim 1, wherein the one or more outputs comprise one or more of: a frontend branch hint, an immediate value, and a micro-operation instruction pointer.

10. The apparatus of claim 1, wherein the DTL circuitry is to atomically program the one or more outputs comprising: a frontend branch hint, an immediate value, and a micro-operation instruction pointer.

11. The apparatus of claim 1, wherein the static input is to indicate a mode of operation for the DTL circuitry.

12. The apparatus of claim 1, wherein the dynamic input is to change for each instruction.

13. The apparatus of claim 1, wherein the dynamic input is to be provided based at least in part on an operand of an instruction.

14. The apparatus of claim 1, wherein a plurality of processor cores of the processor are to share the DTL circuitry.

15. An apparatus comprising:
Data-space Translation Logic (DTL) circuitry to receive a static input and a dynamic input and to generate one or more outputs based at least in part on the static input and the dynamic input;
a frontend counter to generate a count value for the dynamic input based at least in part on an incremented/decremented counter value and a next counter value from the DTL circuitry;
decode circuitry to decode an instruction having a field for an operand value; and
execution circuitry to execute the decoded instruction to provide the dynamic input based at least in part on the operand value.

16. The apparatus of claim 15, wherein the DTL circuitry is capable to receive a new dynamic input prior to consumption of the one or more outputs.

17. The apparatus of claim 15, wherein the DTL circuitry is to cause a selection between the incremented/decremented counter value and the next counter value.

18. The apparatus of claim 17, wherein the selection between the incremented/decremented counter value and the next counter value is to allow for skipping of an iteration or a code block region.

19. The apparatus of claim 15, wherein the DTL circuitry is to generate the one or more outputs prior to commencement of speculation operations in a processor.

20. The apparatus of claim 19, wherein a frontend of the processor comprises the DTL circuitry.

21. The apparatus of claim 15, further comprising a Jump Execution Unit (JEU) to send data from a register file for the dynamic input of the DTL circuitry.

22. The apparatus of claim 15, wherein the one or more outputs comprise one or more of: a frontend branch hint, an immediate value, and a micro-operation instruction pointer.

23. One or more non-transitory computer-readable media comprising one or more instructions that when executed on a processor configure the processor to perform one or more operations to cause:
Data-space Translation Logic (DTL) circuitry to receive a static input and a dynamic input and to generate one or more outputs based at least in part on the static input and the dynamic input;
a frontend counter to generate a count value for the dynamic input based at least in part on an incremented/decremented counter value and a next counter value from the DTL circuitry;
decode circuitry to decode an instruction having a field for an operand value; and
execution circuitry to execute the decoded instruction to provide the dynamic input based at least in part on the operand value.

24. The one or more computer-readable media of claim 23, further comprising one or more instructions that when executed on the at least one processor configure the at least one processor to perform one or more operations to cause the DTL circuitry to receive a new dynamic input prior to consumption of the one or more outputs.

25. The one or more computer-readable media of claim 23, further comprising one or more instructions that when executed on the at least one processor configure the at least one processor to perform one or more operations to cause the DTL circuitry to effect a selection between the incremented/decremented counter value and the next counter value.

* * * * *